United States Patent [19]

Plow

[11] 4,408,273
[45] Oct. 4, 1983

[54] METHOD AND MEANS FOR CATALOGING DATA SETS USING DUAL KEYED DATA SETS AND DIRECT POINTERS

[75] Inventor: Gregory M. Plow, Gilroy, Calif.

[73] Assignee: International Business Machines Corporation, Armonk, N.Y.

[21] Appl. No.: 153,366

[22] Filed: May 27, 1980

[51] Int. Cl.³ .............................................. G06F 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,400,371 | 9/1968 | Amdahl | 364/200 |
| 3,597,745 | 8/1971 | Lahrson | 364/900 |
| 3,670,310 | 6/1972 | Bharwani | 364/200 |
| 4,068,300 | 1/1978 | Bachman | 364/200 |

OTHER PUBLICATIONS

"Shared Direct Access Storage Device Support Improvement", P. C. Jacobs, IBM TDB vol. 14, No. 3, p. 935.
"Portable Catalog", D. P. Casey, et al., IBM TDB vol. 14, No. 3, p. 871.
IBM System/370 System Summary, IBM Publication Number GA 22-7001-6 (Dec. 1976).
IBM System/360 Operating System Introduction, IBM Publication Number GC 22-6534.
*VSAM Primer and Reference*, IBM Publication No. G320-5774-0, Section 3.
*OS/VS2 System Programming Library: Data Management*, IBM Publication No. GC26-3830-3.
*VSAM Catalog Structures and Comparison of VSAM Catalogs and OS CVOL's*, Palo Alto Systems Center Bulletin, No. 220-2841.
"Dynamic Catalog Structure", N. J. King, IBM TDB vol. 13, No. 6, p. 1692.

*Primary Examiner*—Felix D. Gruber
*Assistant Examiner*—Daniel K. Dorsey
*Attorney, Agent, or Firm*—Shelley M. Beckstrand

[57] ABSTRACT

A data set catalog structure eliminates the requirement for base catalog/data volume synchronization in a multi-processing environment while enabling the operating efficiency directly addressing the data volumes. The catalog is distributed between a keyed sequential base catalog and, on each data volume, an entry sequential volume data set. Catalog information which must be synchronized with application data sets is stored in volume records in the volume data set.

A method for opening a user's data set having a key comprises the steps of obtaining from the base catalog a direct pointer associated with the key to the volume record for the user data set; accessing the volume record (relative byte address) addressed by the pointer; comparing the key of the user data set with the key of the accessed volume record; if the keys do not compare, key searching the volume data set to locate the volume record containing correct key and rewriting the direct pointer in the base catalog to address the correct volume record, and obtaining from the correct volume record a direct pointer to the user data set.

21 Claims, 18 Drawing Figures

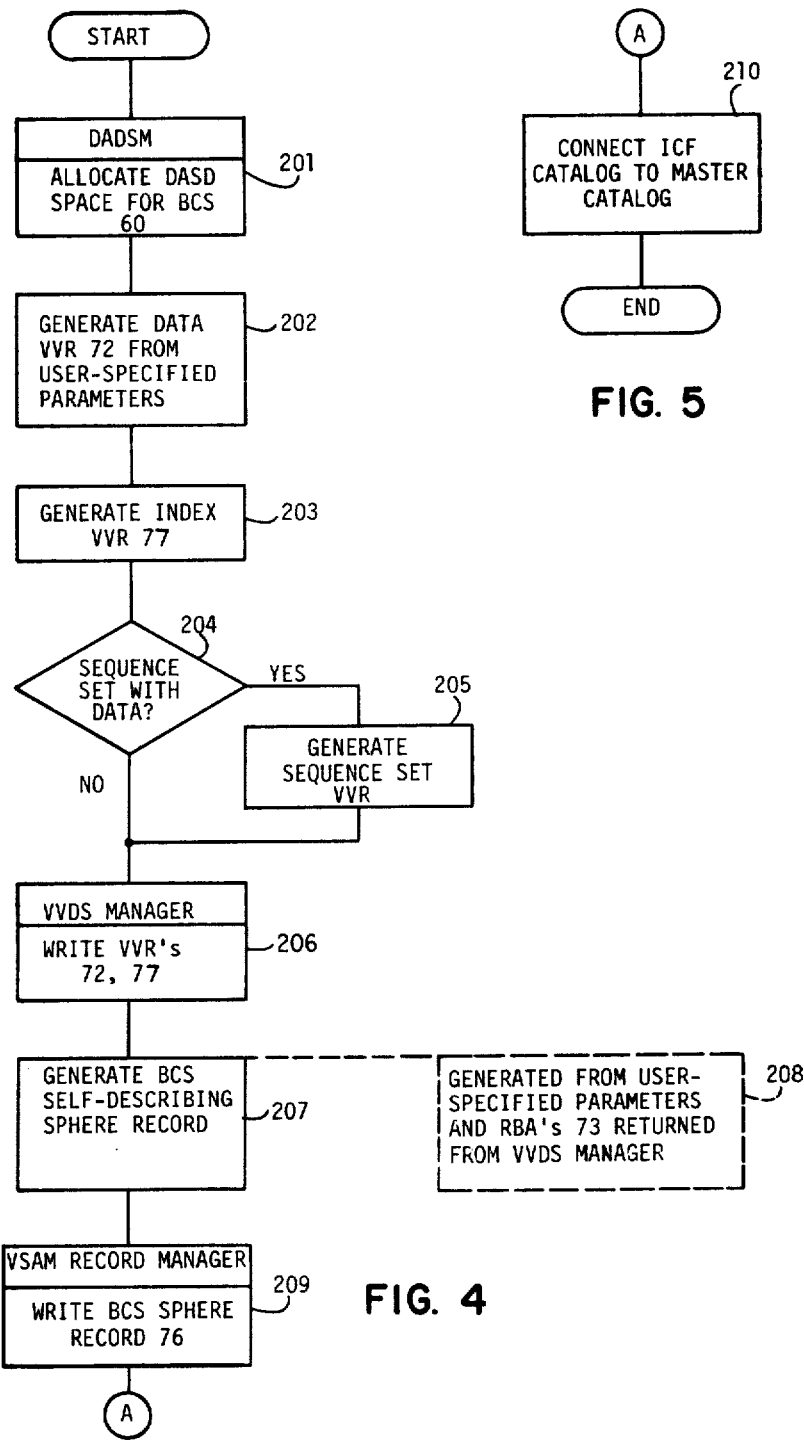

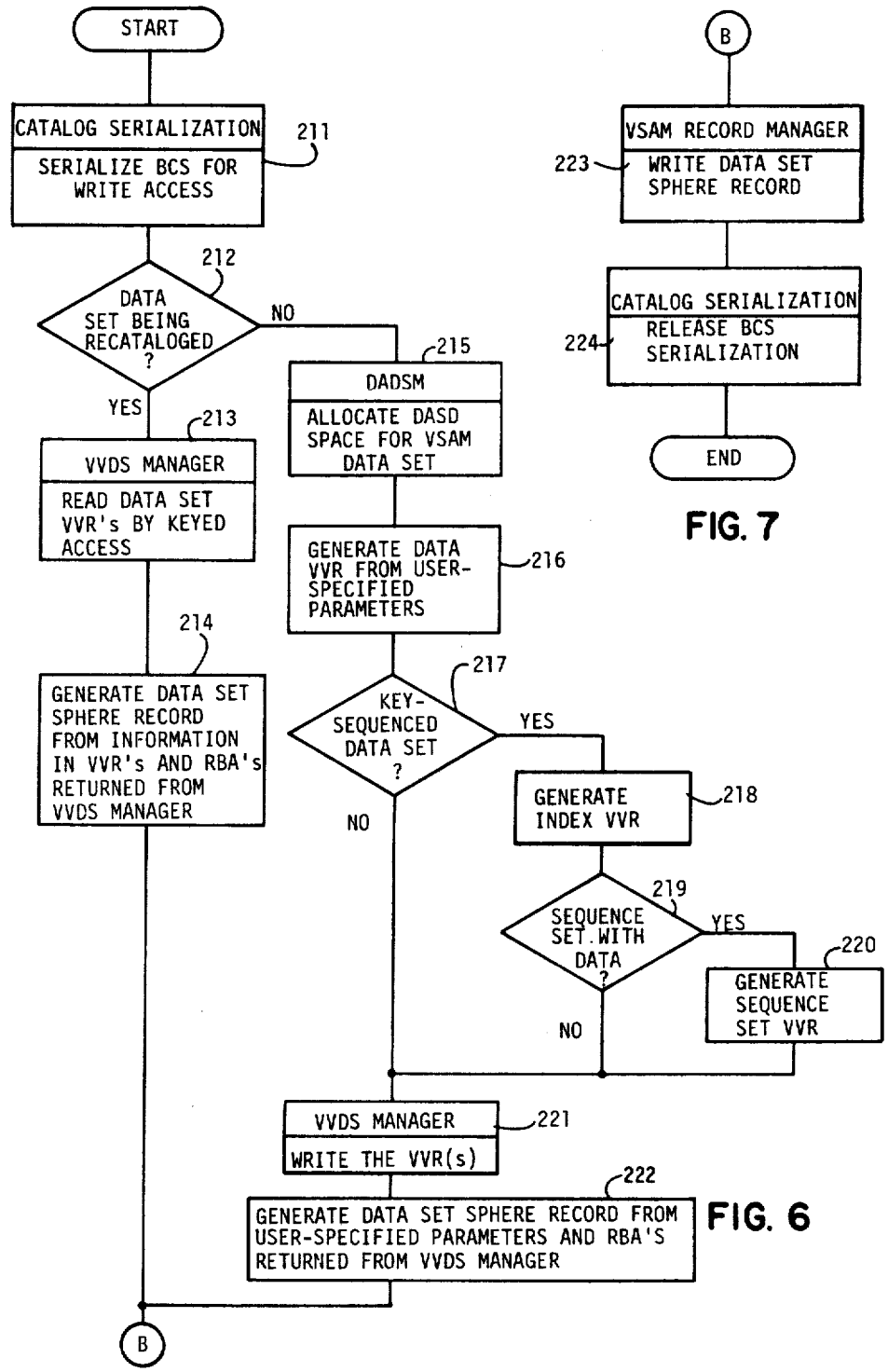

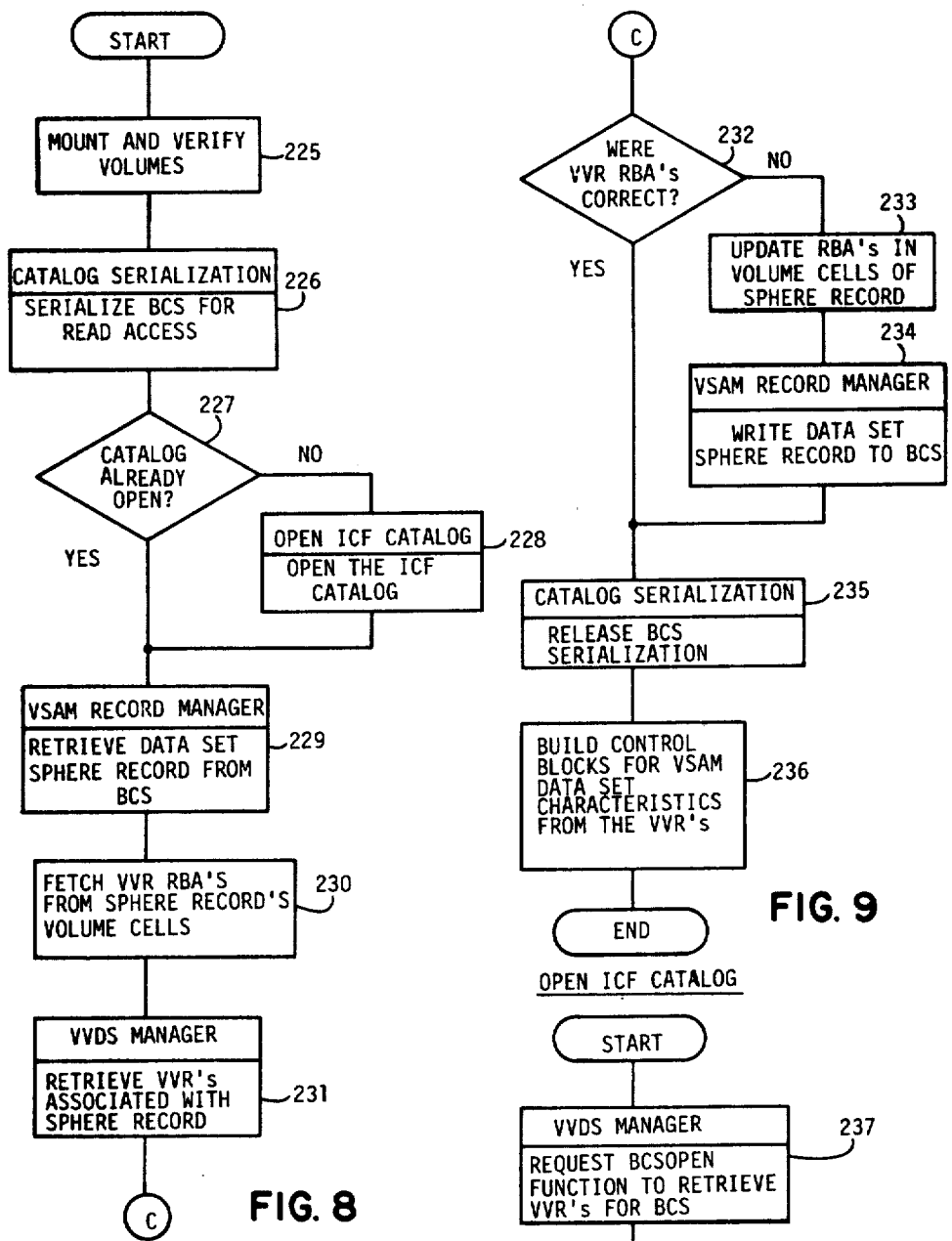

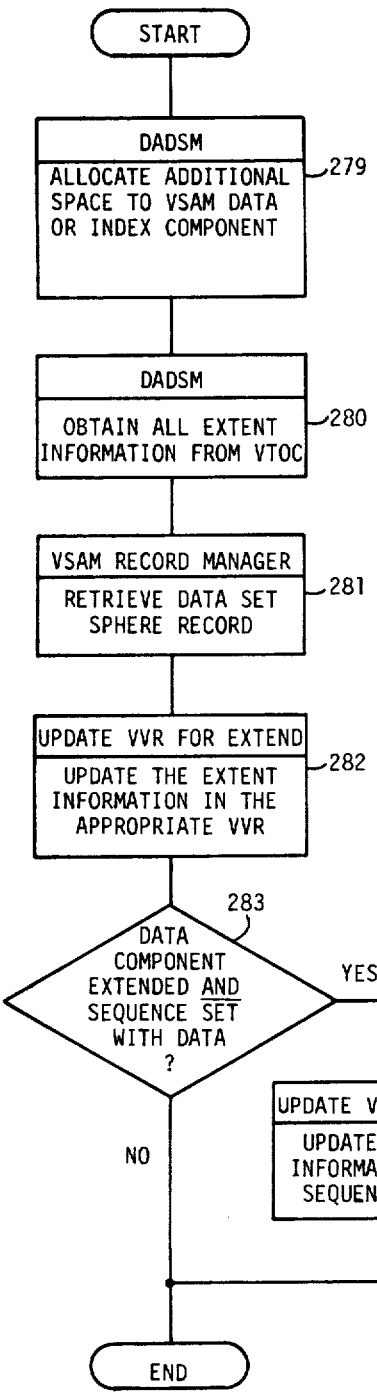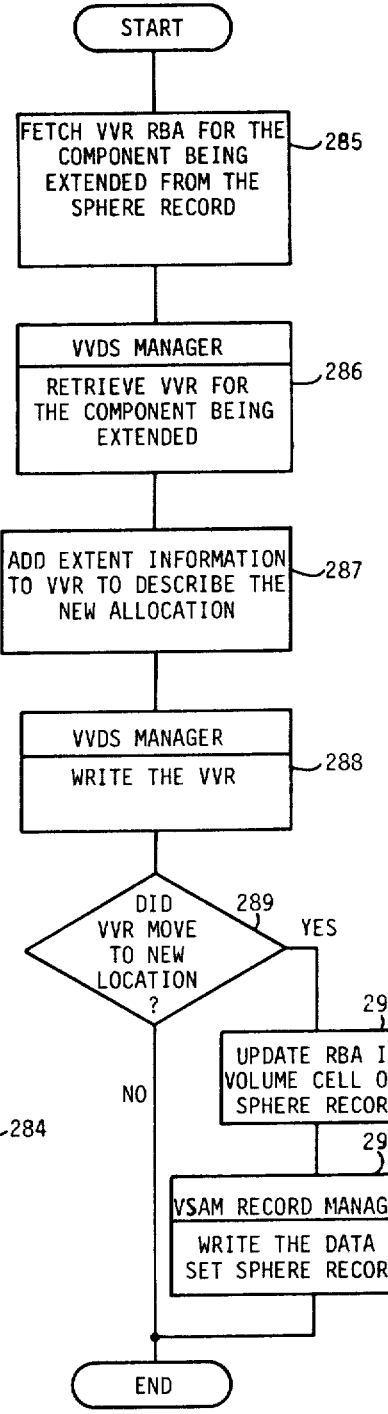
FIG. 15
FIG. 16

METHOD AND MEANS FOR CATALOGING DATA SETS USING DUAL KEYED DATA SETS AND DIRECT POINTERS

TECHNICAL FIELD

This invention relates generally to data processing systems, and more particularly to a catalog structure and method for opening data sets on shared volumes in a multi-processing environment.

BACKGROUND ART

As used in this specification, the term "computing system" includes a CPU with main storage, input/output channel control units, direct access storage devices, and other I/O devices coupled thereto such as is described in G. M. Amdahl, et al., U.S. Pat. No. 3,400,371, issued Sept. 3, 1968 and entitled, "Data Processing System". An "operating system" consists of a set of supervisory routines for controlling the operating of a computing system, including one or more of the following major functions: task management, storage management, input/output management, and data management. An "application program" is a program written to do a user's work, usually in a high-level language, and is loade into main storage and executed under the supervision of the operating system's task manager. A "data set" is any group of related data that one or more users may wish to access. A "record" is a subset of a data set containing all information relating to one element of related data that comprises a data set. A "pointer" is a register, main storage location, or portion of a data set record which contains the main storage or auxiliary storage address of a data item. An example of a pointer is the relative byte address (RBA) of a control interval (CI). A "key" is a register, main storage location, or portion of a data set record which provides an identifier (which may be unique) of the record. A "volume" is a certain portion of data, together with its data carrier (such as a drum, a disk pack, or part of a disk storage module) that can be conveniently handled as a unit. "Open" means to prepare a data set or file for processing; this is done by establishing control blocks in main storage describing the data set and controlling access thereto.

Data management performs the function of controlling the acquisition, analysis, storage, retrieval, and distribution of data. In so doing, it must control all operations associated with input/output devices, such as: allocating space on volumes, channel scheduling, storing, naming, and cataloging data sets, moving data between real and auxiliary storage, and handling errors that occur during input/output operations. The data management routines include access methods, catalog management, direct access device space management (DADSM), and open/close/end-of-volume support. Inasmuch as the method of this invention, in its operation of a computing system, relates to certain portions of these routines, they will be more fully described. Reference is made to IBM System/370 System Summary, IBM Publication Number GA 22-7001-6 (Dec. 1976), and IBM System/360 Operating System Introduction, IBM Publication Number GC 22-6534.

Access methods operate the computing system to move information between virtual storage and external storage, and maintain it in external storage. A variety of techniques and data set organizations are known in the prior art for gaining access to a data set.

A variety of data set organizations may be employed, including the following: sequential, partitioned, indexed sequential, and direct. Basic access methods, which can be used with each of the above data set organizations, include the following: basic sequential (BSAM), basic direct (BDAM), basic indexed sequential (BISAM), and basic partitioned (BPAM). Queued access methods, which can be used only with sequential and indexed sequential data set organizations, are the queued sequential (QSAM) and queued indexed sequential (QISAM).

BSAM sequentially organizes data and stores or retrieves physical blocks of data.

BDAM organizes records within a data set on direct access volumes in any manner the pro grammer selects. Storage or retrieval of a record is set by actual or relative address within the data set. This address can be that of the desired record, or a starting point within the data set, where a search for the record based on a key furnished by a programmer begins. BDAM also uses addresses as starting points for searching for available space for new records.

BISAM stores and retrieves records randomly from an indexed sequential data set. It reads selectively by using the READ macro instruction and specifying the key of the logical record to be retrieved. Individual records can be replaced or added randomly.

BPAM, when used in conjunction with BSAM, stores and retrieves discrete sequences of data (members) belonging to the same data set on a direct access device. Each member has a simple name with the address where the sequence begins. Members can be added to a partitioned data set as long as space is available. (BPAM is usually used to store or retrieve programs).

QSAM organizes data sequentially. It retrieves and stores logical records as requested. QSAM anticipates the need for records based on their sequential order, and normally has the desired record in virtual storage, ready for use before the request for retrieval. When writing data to external storage, the program normally continues as if the record has been written immediately although QSAM's routines may block it with other logical records, and defer the actual writing until the output buffer has been filled.

QISAM creates an indexed sequential data set and retrieves and updates records sequentially from such a data set. Synchronization of the program with the completion of I/O transfer and record blocking/deblocking are automatic. QISAM can also reorganize an existing data set.

The virtual storage access method (VSAM) employs a modified basic and queued access technique and applies to both direct and sequential data sets. VSAM is used with direct access storage devices on the IBM System/370 VS1, SVS and MVS operating systems. It creates and maintains two types of data sets. One is sequenced by a key field within each record and is called a key-sequenced data set (KSDS). Data records are located by using the key field and an index that records key fields and the address of the associated data, similar to ISAM. The other is sequenced by the time of arrival of each record into the data set and is called an entry-sequenced data set (ESDS). Data records are located by using the record's displacement from the beginning of the data set. The displacement is called the RBA (relative byte address). The RBA is similar to the relative block address used with BDAM.

DADSM consists of routines that allocate space on direct access volumes to data sets. The routines are used primarily by job management routines during the initiation of job steps when space is obtained for output data sets. They are also used by other data management routines for increasing the space already assigned to a data set, and for releasing space no longer needed.

When space is needed on a volume, the DADSM routines check the volume table of contents (VTOC) for enough available contiguous tracks to satisfy the request. If there are not enough contiguous tracks, the request is filled using noncontiguous groups of free tracks.

Open/close/end-of-volume (O/C/EOV) support routines;
  Open a data control block (DCB) or access method control block (ACB) before a data is read or written.
  Close a data control block or access method control block after a data set has been read or written.
  Process end-of-volume (EOV) conditions when an end-of-volume or end-of-data (EOD) set condition occurs during an I/O operation.

Open Processing: Before accessing a data set, an OPEN macro instruction must open the DCB (data control block) or ACB (access method control block) for that data set. When a processing program issues an OPEN macro instruction, the open routine of the control program:
  Verifies the mounting of volumes.
  Merges data set attributes from the data definition (DD) statement, VTOC or catalog into the control blocks.
  Determines access method routines.

Close Processing: After processing has been completed for a data set, a CLOSE macro instruction must close the DCB or ACB for that data set. When a processing program issues a CLOSE macro instruction, the close routine of the control program:
  Processes input and output labels.
  Updates data set attributes and statistics in the catalog.
  Disposes of volumes.
  Frees control blocks.
  Restores the DCB or ACB to its original pre-open condition.

End-of-Volume Processing: EOV processing is performed when end-of-data set or end-of-volume conditions occur during I/O operations on sequentially organized data sets. When a routine of a sequential access method encounters a tape or file mark (end-of-data set) or an end-of-volume condition, the routine issues a supervisor call instruction to pass control to the EOV routine.

Catalog management routines maintain the collection of data set indexes (the catalog) that is used by the control program to locate volumes. The catalog management routines also locate the cataloged data sets. The catalog, itself a data set, resides on one or more direct access volumes. It contains indexes that relate data set names to the serial nubers and device types of the volumes containing the data sets. In maintaining the catalog, the catalog management routines create and delete indexes, and add or remove entries.

Prior art catalog management routines include the IBM OS Catalog (see OS/VS2 System Program Library, *Data Management*, IBM Publication No. GC 26-3830-1) and the IBM VSAM Catalog (see *VSAM Primer and Reference*, IBM Publication No. G820-5774-0.)

The OS Catalog contains indexes that relate data set names to the serial numbers and device types of the volumes containing the data sets. A volume table of contents (VTOC) resides on each volume, which contains the data set characteristics of the data sets residing on the volume. To open a data set, catalog management routines search through the OS catalog for the name of the data set. The catalog entry for that data set name includes the volume serial number. In order to access a data set on a volume, it is necessary to sequentially search the VTOC for the record containing the data set name, which record will include direct pointers to the start and end of all segments of the user data set. The user data set can then be read from the external device into main or virtual storage, where it will be available to the application program. The serial scan of the VTOC is a seriously time-consuming process, which increases in severity as hardware advances continue to increase the capacity of DASD devices.

One approach to avoiding the VTOC scan required in the operation of the OS catalog is implemented in the prior art VSAM catalog. The VSAM catalog includes, for each data set, not only the volume serial number of the volume containing the data set, but data set extent and other characteristics. Thus, from information in a central VSAM catalog, access is made directly to data sets on different volumes without the necessity of searching the VTOC of those different volumes. This catalog structure, while enabling the opening of a data set without the VTOC scan, introduced severe operational limitations, among which are catalog/data volume synchronization failure and volume ownership problems. The prior art VSAM catalog, with the catalog and the data sets residing on different volumes and with the data set characteristics stored in the catalog, requires that synchronization be maintained between catalog entries and the data sets (for example, the catalog record must contain correct extent information to reflect the location of the associated data set). This prevents a user from being able to restore a data volume or catalog from a back-up copy since to do so would most likely introduce out-of-synch conditions. Hence, more complex time consuming recovery procedures must be adopted by the user when error conditions in the catalog or data sets occur.

In order to detect this synchronization problem, the prior art VSAM catalog requires that only a single VSAM catalog can manage or reference data sets on any given volume, and a single volume cannot incude more than one VSAM catalog. These restrictions impose severe usability problems in many multiprocessing or multiprogramming system installations where a plurality of VSAM catalogs are required by different users. For instance, it would be highly advantageous to permit users to share volumes for both catalogs and data sets.

SUMMARY OF THE INVENTION

It is accordingly an object of this invention to provide a data base catalog for managing data sets. Further, it is an object of this invention to provide a data base catalog which eliminates catalog/data volume out-of-synch as an error condition. It is a further object of the invention to provide a data base catalog which, in multiprogramming and multiprocessing environments enables users to share volumes for both catalogs and data sets. Further, it is an object that the invention be implementable either within an assembly level language instruction set of contemporary computing systems or as new assembly (machine) level instructions. It is also an objective that the invention be invocable by any system running on the computer, such as an operating system (OS) and/or a data base system (DB).

The above objects are satisfied by a method of operating a computing system on a catalog distributed between a base catalog structure (BCS) on one volume, and a plurality of volume data sets (VVDS), with one VVDS residing on each volume containing user data sets. The base catalog structure (BCS) comprises a plurality of sphere records organized in a key sequential data set, such as a VSAM KSDS. Each volume data set (VVDS) includes a plurality of volume records (VVR) organized in a sequential data set, which may be a VSAM key sequential data set (KSDS) or VSAM entry sequential data set (ESDS). For each user data set, a sphere record is provided in the BCS which includes one or more direct pointers to the locations of the corresponding VVR's, and the VVR's include all extent and other information which must be kept in synchronization with the user data set, which user data set resides on the same volume as the VVR.

The method of the invention operates to use and maintain a data base catalog to open a user data set, the data base catalog including a first keyed data set, and on each volume containing user data sets, a second keyed data set, comprising the steps of searching said first keyed data set for a direct pointer to a first volume record in said second keyed data set; comparing the key of the user data set to be opened with the key of said first volume record; and, if the keys match, opening for access the data set addressed by a direct pointer in said first volume record; if the keys do not match, searching said second keyed data set for a second volume record containing the correct key, updating the direct pointer in said first keyed data set to address said second volume record, and opening for access the user data set addressed by a direct pointer in said second volume record.

BRIEF DESCRIPTION OF THE DRAWINGS

FIGS. 4 and 5 are a flow chart representation of the method steps to define an ICF catalog.

FIGS. 6 and 7 are a flow chart representation of the method steps to define or recatalog an VSAM data set into an ICF catalog.

FIGS. 8 and 9 are a flow chart representation of the method steps to open a VSAM data set. FIG. 10 is a flow chart representation of the method steps to open an ICF catalog.

FIG. 15 is a flow chart representation of the method steps to extend a VSAM data set.

FIG. 16 is a flow chart representation of the method steps to update VVR for extend.

DISCLOSURE OF THE INVENTION

The machine implementable method of the invention may be more fully appreciated by consideration of the following examples as embodied in IBM System/360 machine instructions, said instructions being described in the aforementioned Amdahl patent herewith incorporated by reference, U.S. Pat. No. 3,400,371, and with reference to the drawings.

Figure 2:
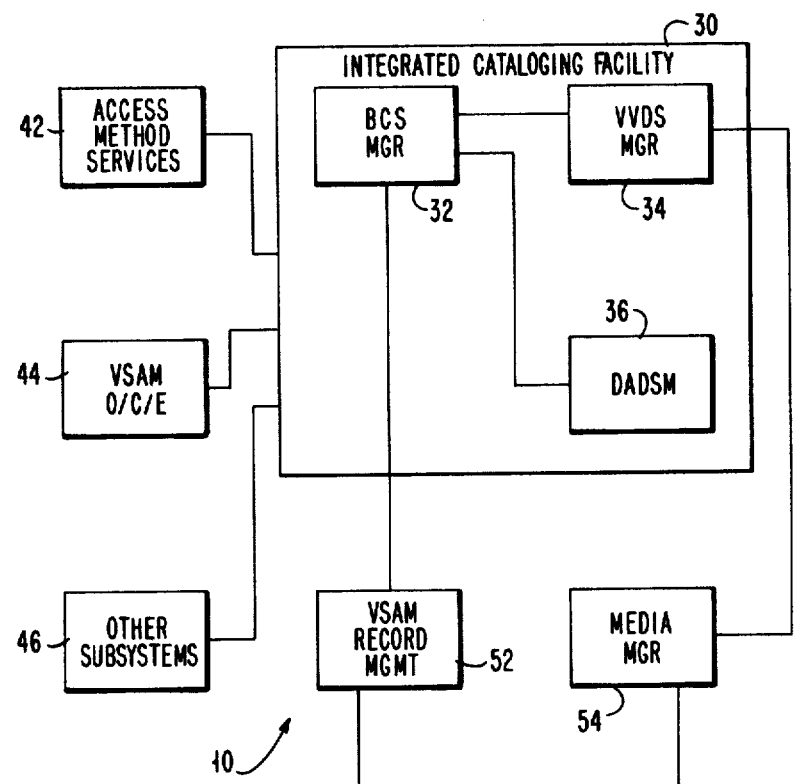
FIG. 2 is a block diagram representation of a system environment adapted for operation according to the method of the invention.
Figure 1:
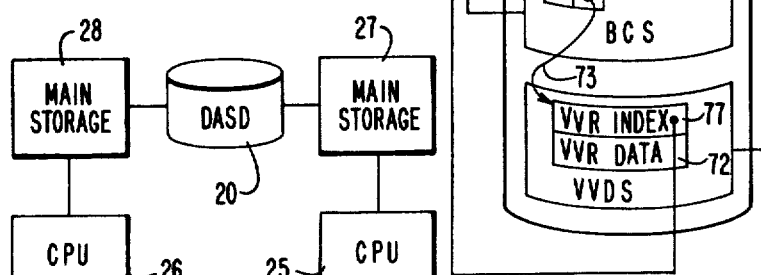
FIG. 1 is a block diagram representation of a typical computing system, showing loosely coupled CPU's sharing a direct access storage device (DASD).
Figure 3:
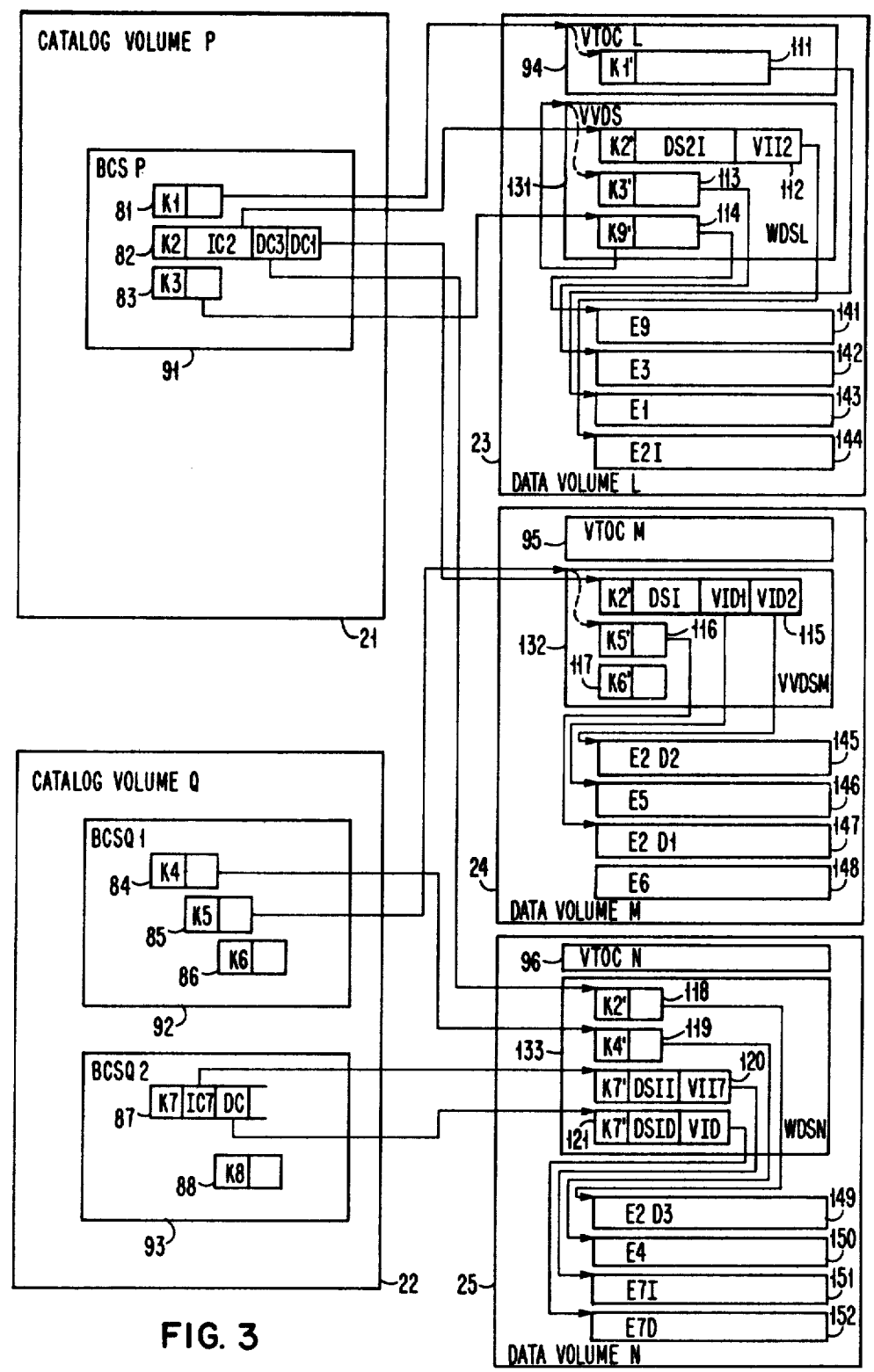
FIG. 3 is a block diagram representation of certain relationships between catalog records and user data sets selected to illustrate the operation of the invention.

Referring to FIG. 1, one implementation of the invention operates a computing system, including a central processor 26 and main storage 28, such as an IBM System/370 and a direct access storage device (DASD) 20. A plurality of such DASD devices is shown in FIG. 3, designated as volumes 21, 22, 23, 24 and 25. CPU 29, having a main storage 27, is loosely coupled through DASD 20 to CPU 26. In such a case, DASD 20 would contain a BCS 60, and each CPU maintains catalog control blocks in its main storage 27, 28. Illustrated in FIG. 2 is the architectural environment showing the interrelationship of various components of an operating system and their relationship with a DASD volume 20 containing cataloging data sets BSC 60 and VVDS 70.

Integrated cataloging facility (ICF) 30 includes basic catalog structure (BCS) manager 32, volume data set (VVDS) manager 34, and direct access device space manager (DADSM) 36. ICF 30 responds to access method services 42, VSAM open/close/end-of-volume 44 and other data management subsystems 46, and utilizes the services of VSAM record management 52 and media manager 54 to DEFINE, OPEN, EXTEND, CLOSE, DELETE, and RECATALOG data sets on volumes 20–25, as will more fully be described hereafter.

BCS manager 32 receives control following a supervisor call from the operating system 42, 44, 46, and performs a catalog transaction as specified in the accompanying catalog parameter list (CPL) of Table 1, field vector table (FVT) of Table 2, and field parameter lists (FPB). BCS manager 32 invokes VVDS manager 34 and DADSM 36, as required, to complete the catalog request, as will be more fully described hereafter.

BSC manager 32 initializes and maintains base catalog structure (BCS) 60, using VSAM record management 52. BCS 60 primarily includes volume and association information, and thus can be used to translate a symbolic name into the actual data components reflected by that name, and the volume serial numbers associated with each data component. BCS 60, herein, is a keyed data set, such as a VSAM key sequential data set (KSDS).

VVDS manager 34 initializes and maintains volume data set (VVDS) 70. VVDS 70, herein, is keyed data set, such as a VSAM entry sequential data set (ESDS) or KSDS. It contains the data set characteristics of VSAM data sets residing on the same volume as the VVDS itself, and there exists one VVDS 70 on each volume containing VSAM data. That single VVDS can be shared by plural BCS 60's, as will be more fully described.

TABLE 1

| NAME | Catalog Parameter List (CPL)<br>DESCRIPTION |
|---|---|
| CTGOPTN1 | First option byte: |
| CTGBYPSS | Bypass the catalog management security verification process. |
| CTGMAST | Check the master password. |
| CTGCI | Check the control interval password. |
| CTGUPD | Check the update password. |
| CTGREAD | Check the read password. |
| CTGNAME | The CTGENT field contains the address of a 44-byte DSNAME, or a 6-byte volume serial number (padded with binary 0's). |
| CTGCNAME | The CTGCAT field contains the address of a catalog's 44-byte DSNAME.<br>The CTGCAT field contains the address of a 4-byte field containing a VSAM catalog's ACB address. |
| CTGGENLD | Generic locate request. |
| CTGOPTN2 | Second option byte: |
| CTGEXT | Extend option (with UPDATE). |
| CTGNSVS | Catalog cleanup request (with DELETE). |
| CTGERASE | Erase option (with DELETE). |
| CTGSMF | Write SMF record option (with LSPACE). |
| CTGREL | Reset to empty status. |
| CTGGTALL | Search all catalogs (with LISTCAT). |
| CTGPURG | Purge option (with DELETE). |
| CTGVMNT | The caller is VSAM Open/Close/EOV: Volume Mount and Verify routine (IDA0192V). |
| CTGRCATN | Return the catalog name (with generic LOCATE). |
| CTGTTNXT | Get-next option (with LISTCAT). |
| $ CTGDELRC | Delete recovery. |
| CTGDISC | Disconnect option (with EXPORT). |
| CTGOVRID | Erase override option (with DELETE). |
| CTGSCR | Scratch space option (with DELETE). |
| $ CTGBOTH | Caller can accept the ICF catalog architecture. |
| CTGOPTN3 | Third option byte: |
| CTGFUNC | Specifies the caller-requested function: |
| CTGLOC | LOCATE |
| CTGLSP | LSPACE |
| CTGUPDAT | UPDATE |
| CTGCMS | A Catalog Management Services function. |
| CTGSUPLT | SUPERLOCATE function. |
| CTGCDCL | GDG locate request-the caller supplied the base generation level (CTGWAAGB field in CTGWA). |
| CTGSRH | Search the master catalog only.<br>Search the user's catalog first (specified by CTGCAT or, if CTGCAT=0, search the user's catalogs available to the caller via JOBCAT or STEPCAT DD statements, then search the master catalog). |
| CTGNUM | Search one catalog.<br>Search both catalogs. |
| CTGAMO | The call is an OS/VS2 catalog management request.<br>The call is an OS catalog management request; the caller supplied a CAMLST parameter list that was translated into this CTGPL and CTGFLs. |
| CTGOPTN4 | Fourth option byte: |
| CTGLBASE | Locate the base level (with SUPERLOCATE-GDG only). |
| CTGDOCAT | If the needed catalog is not open, dynamically allocate and open it.<br>Do not dynamically open the needed catalog. |
| CTGNPROF | No RACF profile to be defined or deleted. |
| CTGCOIN | Controller intercept requested. |
| CTGBYPMT | Bypass security prompting to system operator. |
| CTGTIOT | Caller owns SYSTIOT exclusive. |
| CTGICFC | The catalog is of the new ICF architecture. This bit is set by ICF Catalog Management on return if the request caused orientation to an ICF Catalog. |
| CTGICFOR | Request is for ICF catalog only. |
| CTGENT | Address of the catalog record identifier, as defined in CTGOPTN1. When the request is generic locate, byte 1 of the field pointed to by CTGENT is a length byte, followed by a 1 to 43 character generic name. |
| CTGFVT | Address of the caller's CTGFV. |
| CTOGCAT | Address of catalog's DSNAME or of a 4-byte field that contains the address of the catalog's ACB, as specified in CTGOPTN1. |
| CTGCVOL | Address of an OS/VS system-catalog name area, if the request is SUPERLOCATE. The catalog name area contains the catalog's DISNAME and if the catalog is identified with an alternate DSNAME, the catalog's alias. The OS/VS2 Scheduler uses this information to build the catalog's PCCB. |
| CTGWKA | Address of the caller's work area. |
| CTGDSORG | Data set organization, if the request is SUPERLOCATE. |
| CTGOPTNS | Catalog Management Services request options: |
| CTGDEFIN | DEFINE |
| CTGALTER | ALTER |
| CTGDELET | DELETE |
| CTGLTCAT | LISTCAT |
| CTGNVTV | CONVERTV |
| CTGF2WKA | User Work Area format 2. |
| CTGTYPE | Type of catalog record. |
| CTGTALIN | NonVSAM data set |
| CTGTGBS | Generation data group (GDG) base. |
| CTGTCL | Cluster |
| CTGTDATA | Data set |
| CTGTFREE | Free (not supported in ICF). |
| CTGTAIX | Alternate index. |
| CTGTINDX | Index |
| CTGTMCAT | Master catalog. |
| CTGTPGSP | Page space. |
| CTGTPTH | Path. |
| CTGTTNE | True name entry (ICF only) |
| CTGTUCAT | User catalog. |
| CTGTVOL | Volume. |
| CTGTANM | Alias name. |
| CTGTUFG | Upgrade. |
| CTGNOFLD | Number of entries contained in CTGFILED. |
| CTGDDNM | Address of the JCL DD statement, if one is associated with this request. |
| CTGNEWNM | Address of the new DSNAME, if the request is ALTER and the object's name is being changed. |
| If the request is SUPERLOCATE: | |
| CTGFDBK | Feedback area. |
| CTGFBFLG | Flags: |
| CTGPAR | Parallel mount. |
| CTGKEEP | Forced keep. |
| CTGSDGB | GDG Base locate. |
| CTGNGDSN | Generation data set name was generated (in the form 'dsname.gxxxxvyy')> |
| CTGJSCB | Address of the JCSB. |
| CTGPSWD | Address of the call-supplied password. |
| CTGFIELD | The 4-byte address of each CTGFL, to specify each catalog field to be processed. The length of the CTGFIELD is the CTGNOFLD value times 4. |

VVDS manager 34 is called by BCS manager 32 whenever information is to be stored or retrieved from VVDS 70.

DADSM 37 performs all DASD space management functions, as is more fully described in OS/VS2 DADSM Logic, IBM Publication Number SY26-3828.

VVDS 70 is dynamically generated, if not previously defined on a given volume 20, when the first VSAM data set (such as BCS 60 in FIG. 1 or any of data sets 141-152 of FIG. 3) is defined on the volume and is dynamically extended whenever additional space for the VVDS is needed. Any combination of BCS's 60 and data sets cataloged in BCS's 60 may exist on a volume.

VVDS 70 contains a plurality of volume records (VVR's) 72, 77 herein organized in an entry sequence data set (ESDS). VVR 72 contains data set characteristics and all volume 20 related extent and relative block address (RBA) information for the data component of a VSAM KSDS data set.

By this invention, the computing system is operated to enhance catalog recovery. This is accomplished by recording data set characteristics which must be synchronized with the data set in the VVDS(s) associated with the data volume(s) for the data set. This allows periodic back-up copies of catalog 60 to be taken, enabling recovery operations to occur without introducing catalog 60/data volume out-of-synch conditions. That is, the information which could become obsolete (high-used RBA on volume, extents, etc.) is located not in the BCS, but in the VVDS. Therefore, each volume's VVDS will contain information which changes as a data set is processed. If the base catalog structure (BCS) is lost, and subsequently restored from a back-up copy, any missing catalog entries can be re-established from records within the VVDS. The VVDS for each volume of the data set contains VVR's with volume-related information. In addition, data set characteristics which pertain to the data set as a whole appear only in the VVDS for the first volume of the data set (hereinafter referred to as the primary volume) since they are constant over all volumes.

VVDS manager 34 maintains VVDS 70 and provides the protocol for processing VVR's 72, 77, including the following request types, to be more fully described hereafter:
READ
INSERT
DELETE
GET FOR UPDATE
PUT FOR UPDATE
GENERIC READ
GENERIC DELETE
BCS OPEN
CATALOG NAME DELETE
END UPDATE
RETURN CATALOG NAMES Referring to FIG. 3, a description will be given of a sample configuration of catalog and data volumes, illustrating relationships existing between BCS, VTOC's, VVDS, and user data sets.

By way of example, catalog volumes P and Q and data volumes L, M and N are shown to reside on separate DASD's 21-25. Catalog volume 21 includes BCS 91 and volume 22 includes BCS 92 and 93. A plurality of sphere records 81-88 are organized in KSDS's with key fields K1-K8, respectively. Each sphere record, in addition to key fields (K1-K8), includes one or more pointer fields, such as those designated IC2, DC1, DC3, and DC.

Each data volume includes a volume table of contents (VTOC) 94-96, a volume data set (VVDS) 131-133, and one or more user data sets, or extents 141-152, with extent E2I designating the index for data set 2, and E2D1 the first extent for the data portion of data set 2. Each VVDS is an entry sequence data set (ESDS), including a plurality of volume records (VVR's) 112-121. Each VVR 112-121 includes a key field K2'-K9' and extent descriptions, or pointers, such as VII2, VID1, VID2, VII7 and VID. These pointers provide the relative byte addresses (RBA's) of the user data set extents 141-152.

Various relationships are illustrated between the sphere records and user data sets to facilitate a better understanding of the method of the invention.

Sphere record 81 catalogs a non-VSAM data set 143. Record 81 points to the beginning of VTOC 94, which one each access must be sequentially searched for the key K1' matching key K1 and identifying the user data set 143. VTOC record 111 contains that key, and includes direct address pointers defining the extent of data set 143.

Sphere record 82 catalogs a VSAM data set E2, which includes an index extent 144, and three data extents 147, 145, and 149. Pointer IC2 in sphere record 82 points to the VVR 112, which includes a key field K2' matching key K2 and identifying data set E2, a field DS2I describing index data set 144 and a field VII2 pointing to the location of data set 144. Pointer DC1 in sphere record 82 gives the address of primary VVR 115, which includes a key field K2', data set information DSI for data set E2, and extent descripters VID1 and VID2 of the two extents 147 and 145 of data set E2 on volume 24. Pointer DC3 in sphere record 82 gives the address of VVR 118 which includes key field K2' and a pointer to extent 149 of data set E2 on volume 25. VVR 118 is not a primary VVR (as each data or index component has only one primary VVR, and for the data component of data set E2 that is VVR 115), so it does not include a data set information field.

Sphere record 83, having key K3, includes a field pointing to VVR 114, which includes a pointer to user data set 141. However, as key K9'≠K3, a sequential search of VVDS 131 would be performed to locate VVR 113, which provides a pointer to data set 142. The address of VVR 113 would be returned to correct the pointer in sphere record 83, as will be more fully described. Sphere record 84, having key K4, points to VVR 119, which, in turn, points to data set 150. Sphere record 85 points to VVDS 132, and illustrates that optional operational mode where a VVR pointer is not provided to the VVDS manager, and a sequential key search of VVDS 132 is made to locate VVR 116 having key K5'=key K5. VVR 116 points to data set 146.

Sphere record 87, having a key field K7 and K71, also includes an index component IC7 pointing to VVR 120 and a data component DC pointing to VVR 121, both in VVDS 133. VVR's 120 and 121 are both primary VVR's, and thus include data set information cells DSII for the index data set and DSID for the data data set, respectively. VVR 120 field VII7 points to index data set 151, and VVR 121 field VID points to data set 152.

The data set and record relationships shown in FIG. 3 illustrate various aspects of the invention and will be further described in connection with the flow charts of FIGS. 4-18 hereafter.

Referring to FIGS. 4-17 in connection with FIGS. 1-3, a description will be given of the steps for operating a computing system illustrating the environment in which the method of the invention is accomplished. The processes herein illustrated include the following:
Defining an ICF Catalog.
Defining a VSAM data set into an ICF Catalog.
Recataloging a VSAM data set.
Opening a VSAM data set.
Extending a VSAM data set.

Referring now to FIG. 4 in connection with FIG. 2, a description will be given of defining an ICF catalog 60. A user application program, executing in CPU 26, invokes AMS, which invokes the BCS manager which in step 201, invokes the DADSM 36 component of the operating system, which allocates space on DASD 20 for the catalog, as is more fully described in OS/VS2 DADSM Logic, IBM Publication SY 26-3828. The user application specifies, in main storage 28, parameters which will be used in step 202 by BCS manager 32 in response to a supervisor call (SVC26) from AMS 42 to generate the data VVR 72, and in step 203 to generate a primary index VVR 73. The user-specified parameters include the catalog parameter list (CPL) of Table 1; the field vector table (FVT) of Table 2; and the field parameter lists (FPL) described in IBM Publication SY 26-3826. The volume record (VVR) 72, 73, 112-121, is described in Table 3 (VVR Header), Table 4 (VVR Data Set Information Section—Example), Table 5 (VVR Volume Information) and Table 6 (AMDSB Section).

TABLE 2

| Field Vector Table (FVT) | |
|---|---|
| FIELD NAME | DESCRIPTION |
| CTGFVTYP | RECORD TYPE |
| CTGPVALN | NONVSAM |
| CTGFVGBS | GENERATION DATA GROUP (GDG) |
| CTGFVCL | CLUSTER |
| CTGFVDTA | DATA |
| CTGFVAIZ | AIX |
| CTGFVIDX | INDEX |
| CTGFVPTH | PATH |
| CTGFVANM | ALIAS |
| CTGFVVOL | VOLUME (NOT USED FOR ICF) |
| CTGFVPRO | CMS PROCESSING OPTION FLAGS |
| CTGFVAVL | ALTER: Add volumes |
| CTGFVRVL | ALTER: Remove volumes |
| CTGFVNDC | NO DEVICE TYPE CONVERSION |
| CTGFVDRC | DEFINE A RECOVERABLE CATALOG (NOT ICF) |
| CTGFVRON | TURN RACF INDICATOR ON |
| CTGFVROF | TURN RACF INDICATOR OFF RESERVED |
| CTGFVELM | ELEMENT NUMBER OF CMSPCATR |
| CTGFVFL2 | CMS PROCESSING OPTION FLAGS |
| CTGFVDCR | DEFINE with DIRECTED CREATE |
| CTGFVNAL | DEFINE with NO-ALLOCATION |

TABLE 2-continued

| Field Vector Table (FVT) | |
|---|---|
| FIELD NAME | DESCRIPTION |
| CTGFVICF | DEFINE an ICF catalog<br>0 = VSAM catalog<br>1 = ICF catalog |
| CTGFVRCT | DEFINE RECATALOG (ICF ONLY) RESERVED |
| CTGFVDCH | ADDRESS OF THE CLUSTER's DATA FVT |
| CTGFVICH | ADDRESS OF THE CLUSTER's INDEX FVT |
| CTGFVVCH | ADDRESS OF THE SPACE FVT |
| CTGFVIND | ADDRESS OF THE DDNAME JCL STATEMENT |
| CTGFVENT | ADDRESS OF THE ENTRY NAME |
| CTGFVSTY | ADDRESS OF THE SECURITY INFO FPL |
| CTGFVOWN | ADDRESS OF THE OWNER IDENT FPL |
| CTGFVEXP | ADDRESS OF EXPIRATION DATE FPL |
| CTGFVCRE | ADDRESS OF CREATION DATE FPL |
| CTGFVVLT | ADDRESS OF THE VOLUME SERIAL NUMBER LIST |
| CTGFVRNG | ADDRESS OF THE KEYRANGE FPL |
| CTGFVDVT | ADDRESS OF THE DEVICE TYPE FPL (nonvsam) |
| CTGFVSPC | ADDRESS OF THE SPACE ALLOCATION FPL |
| CTGFVTTR | ADDRESS OF THE DSCB TTR FPL (nonvsam) |
| CTGFVAMD | ADDRESS OF THE AMDSB FPL |
| CTGFVFSN | ADDRESS OF THE FILE SEQ # FPL (nonvsam) |
| CTGFVATR | ADDRESS OF THE DATA SET ATTR FPL |
| CTGFVBUF | ADDRESS OF THE BUFFERSIZE FPL |
| CTGFVLRS | ADDRESS OF THE RECORDSIZE FPL |
| CTGFVLMT | ADDRESS OF THE GDG LIMIT FPL |
| CTGFVEXT | ADDRESS OF THE EXCEPTION EXIT FPL |
| CTGFVGAT | ADDRESS OF THE GDG ATTRIBUTES FPL |
| CTGFVUPG | ADDRESS OF THE RGATTR RPL |
| CTGFVNAM | ADDRESS OF THE TRUE NAME FPL (alias) |
| CTGFVPWD | ADDRESS OF THE RELATED OBJECTS PASSWORD |
| CTGFVWKA | ADDRESS OF THE CRA FEEDBACK AREA (not ICF) |
| CTGFVELT | ADDRESS OF THE EXTENT LIST FOR DEFINE |

TABLE 3

VVR Header Cell (Example)

| LEN | T Y | F L | K R | COMP NAME LEN | COMP NAME | KEY LEN | KEY | CAT NAME LEN | CAT NAME | AIX NAME LEN | AIX NAME |
|---|---|---|---|---|---|---|---|---|---|---|---|
| | P E | A G | Q | | | | | | | | |

| NAME | DESCRIPTION |
|---|---|
| VVRHDLEN | Length of VVR Header (includes itself) |
| VVRTYPE | Type code field.<br>The primary VVR has a type code of C'Z' (the data set and AMDSB cells are present).<br>The secondary VVR has a type code of C'Q'. |
| VVRFLAG | Flag field. |
| VVRCOMTP | Data Component.<br>Index Component. |
| VVRSELFD | Self describing VVR for VVDS. |
| VVRCATSD | Catalog self describing VVR. |
| VVRKRQ | Key Range Qualifier. |
| VVRCMPNL | Length of component name (does not include itself). |
| VVRCMPNM | Component name. |
| VVRKEYL | Length of key (cluster name + pad) (does not include itself). |
| VVRKEY | Key (cluster name + pad). |
| VVRCATNL | Length of catalog name (does not include itself). |

TABLE 3-continued
VVR Header Cell (Example)

| LEN | T Y P E | F L A G | K R Q | COMP NAME LEN | COMP NAME | KEY | KEY LEN | CAT NAME LEN | CAT NAME | AIX NAME LEN | AIX NAME |
|---|---|---|---|---|---|---|---|---|---|---|---|

| NAME | DESCRIPTION |
|---|---|
| VVRCATNM | Catalog name. |
| VVRAIXNL | Length of AIX name (does not include itself). |
| VVRAIXNM | AIX name. |

TABLE 4
VVR Data Set Information Cell

| LEN | T Y P E | A T R 1 | A T R 2 | OPN IND | BUF SZ | PRI SPC | SEC SPC | SPC OPT | DS HU RBA | DS HA RBA | L R E C L | R E V P | E S C P X | DS HK RBA | CLS ATR | AIX ATR | # DS EXT |
|---|---|---|---|---|---|---|---|---|---|---|---|---|---|---|---|---|---|

| NAME | DESCRIPTION |
|---|---|
| VVRDSLEN | Length of data set cell (includes itself). |
| VVRDSTYP | Type code. Set to X'21'. |
| VVRATTR1 | Data set attributes. |
| VVRA1SPD | Speed |
| VVRA1UNQ | Unique |
| VVRA1REU | Reusable |
| VVRA1ERS | Erase |
| VVRA1IUP | Inhibit update |
| VVRA1TEX | Temporary export |
| VVRA1TKO | Track overflow |
| VVRATTR2 | Share attributes. |
| VVRA2REG | Regional sharing attributes |
| VVRA2RL1 | READ share or 1 UPDATE/OUTPUT user |
| VVRA2RL2 | READ share and 1 UPDATE/OUTPUT user |
| VVRA2RL3 | Fully shared |
| VVRA2RL4 | Fully shared with VSAM assistance |
| VVRA2SYS | System sharing attributes |
| VVRA2SL1 | Fully shared |
| VVRA2SL2 | Fully shared with VSAM assistance |
| VVRA2INT | Internal system data set |
| VVRA2NUS | Component is not usable |
| VVROPIND | Open indicator. |
| VVRBUFSZ | Minimum buffer size. |
| VVRPRISP | Primary space allocation. |
| VVRSECSP | Secondary space allocation. |
| VVRSPCOP | Space option flags. |
| VVRSPCTK | Track allocation |
| VVRSPCCY | Cylinder allocation |
| VVRDSHU | Data set high used RBA. |
| VVRDSHA | Data set high allocated RBA. |
| VVRLRECL | Average logical record length. |
| VVREXCPX | Exception exit. |
| VVRDSHK | Data set high key RBA. |
| VVRCLSFG | Cluster attribute flag. |
| VVRCFSWS | Cluster describes swapspace |
| VVRCFPGS | Cluster describes pagespace |
| VVRAIXFG | AIX attribute flag. |
| VVRAIUPG | Upgrade AIX |
| VVRNODSE | Number of data set extents. |

TABLE 5
VVR Volume Information Cell

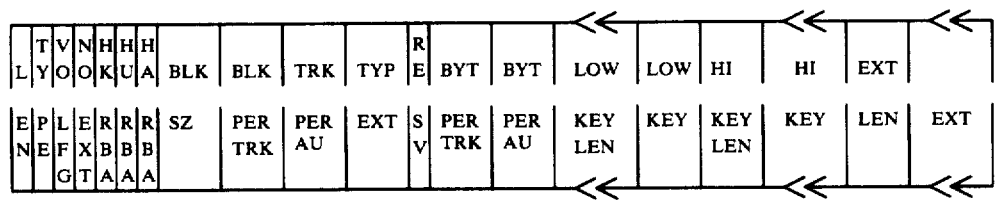

| NAME | DESCRIPTION |
| --- | --- |
| VVRVOLLN | Length of volume cell (includes itself). |
| VVRVOLTP | Type code X'23'. |
| VVRVOLFG | Volume flags. |
| VVRPRIME | Prime volume. |
| VVROVFLW | Overflow volume. |
| VVRNOEXT | Number of volume data set extents. |
| VVRHKRBA | High key RBA. |
| VVRHURBA | High used RBA. |
| VVRHARBA | High allocated RBA. |
| VVRBLKSZ | Block size. |
| VVRBLKTK | Number of blocks per track. |
| VVRTRKAU | Number of tracks per allocation unit. |
| VVRTPEXT | Extent type flag. |
| VVRSSDAT | Sequence set with data. |
| VVRNOPFM | Extents not performatted. |
| VVRBYTTK | Number of bytes per track. |
| VVRBYTTAU | Number of bytes per allocation unit. |
| VVRLOKYL | Low key length (does not include itself.) |
| VVRLOKYV | Low key on volume. |
| VVRHIKYL | High key length (does not include itself). |
| VVRHIKYV | High key on volume. |
| VVRXTNTL | Length of extent section (does not include itself). |
| VVRXTNT | Extents (one or more 20 byte sets). |

TABLE 6
AMDSB Cell

| LEN | AMDSB |
| --- | --- |

Statistics section of AMDSB

| | |
| --- | --- |
| AMDSTSP | System time stamp. |
| AMDNIL | Number of index levels. |
| AMDNEXT | Number of extents. |
| AMDNLR | Number of logical records. |
| AMDDELR | Number of deleted records. |
| AMDIREC | Number of inserted records. |
| AMDUPR | Number of updated records. |
| AMDRETR | Number of retrieved records. |
| AMDASPA | Bytes of free space in data set. |
| AMDNCIS | Number of CI splits. |
| AMDNCAS | Number of CA splits. |
| AMDEXCP | Number of EXCP's. |

In the VVR's generated in steps 202 and 203, VVRCATSD field will include an indication that it is a catalog self-describing VVR 72, 73 (FIG. 2).

In step 204, a test is made to determine if the user has specified that the lowest level of the index is to reside on the same cylinder as the data portion of the BCS 60. This option may be selected for performance purposes to avoid the necessity of an arm access movement between the BCS index search and actual read of the corresponding BCS data record.

If the sequence set (lowest level of the index) is to be located on the same cylinder so that the data portion, a VVR is generated in step 205, which will be a non-primary VVR describing that sequence set, which is separate data (extents) from the remainder of the index data set (described by the index VVR generated in step 203).

In Table 7 is set forth the format of a primary volume VVR, and in Table 8 is the format of a non-primary volume VVR. VVR's 112, 115, 120, and 121 are examples of primary VVR's, while VVR 118 is a non-primary VVR (see FIG. 3).

TABLE 7
Example of VVR Cells for Primary Volume VVR

| VVR LEN | VVR HEADER CELL | VVR DATA SET INFO CELL | VVR AMDSB CELL | VVR VOLUME CELL | TYPE CODE IN HEADER IS 'Z' |
| --- | --- | --- | --- | --- | --- |

TABLE 8
Example of VVR Cells for Non-Primary Volume VVR

| VVR LEN | VVR HEADER CELL | VVR VOLUME CELL | TYPE CODE IN HEADER IS 'Q' |
| --- | --- | --- | --- |

The first VVR for a data set is the primary VVR and contains the information pertaining to a data set that remains constant over all of its volumes (data sets may span many volumes). Data set information begins with the label VVRATTR1 and ends with the AMDSB fields (see Tables 4 and 6 in connection with Table 7).

Figure 11:
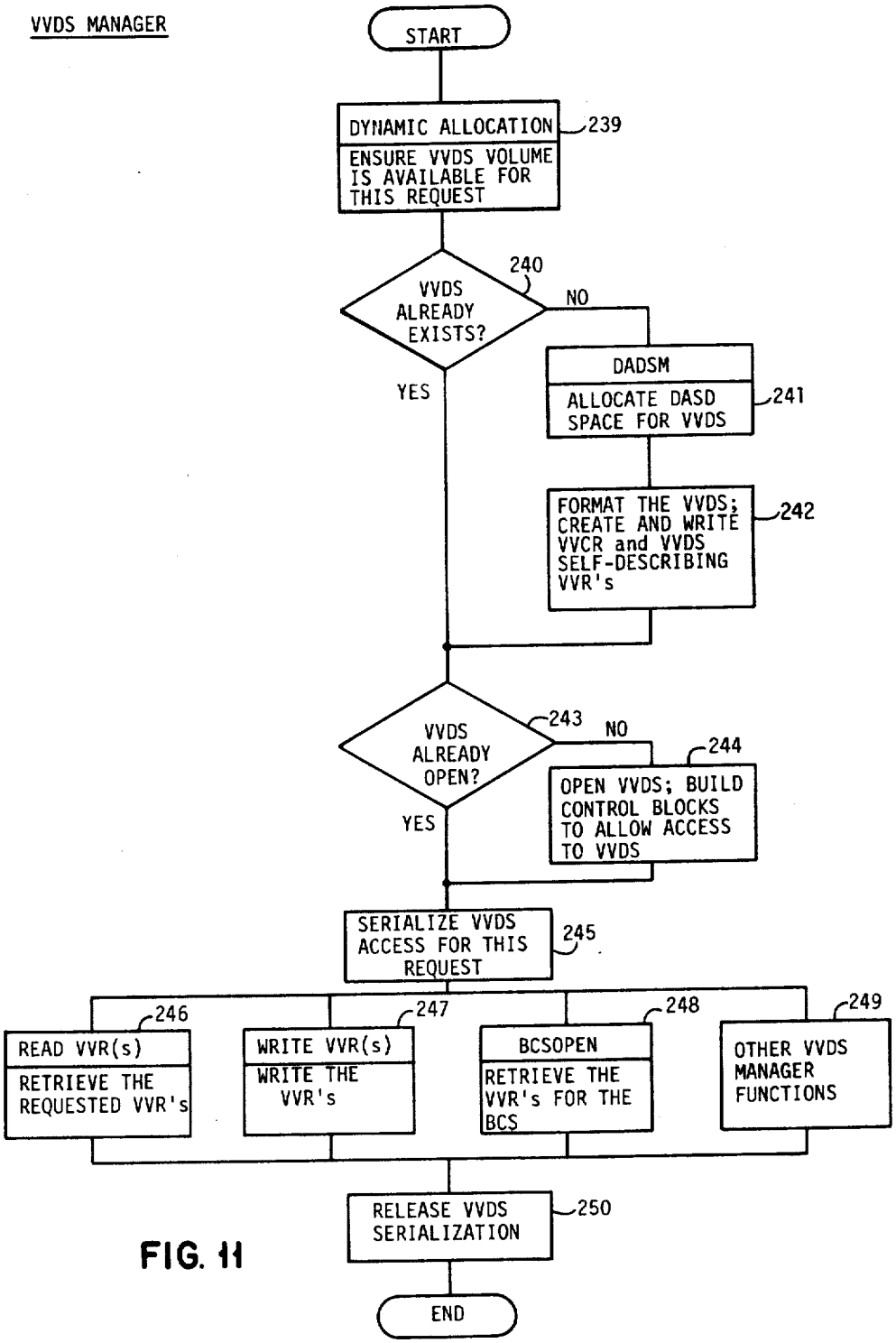
FIG. 11 is a flow chart representation of the method steps performed under control of the VVDS manager.

Continuing with the description of FIG. 4, in step 206 the VVR's generated in steps 202-205 are written under control of VVDS manager 34 by media manager 54 onto DASD 20. The operation of VVDS manager 34 is described in greater detail in connection with FIG. 11. When VVDS manager 34 (FIG. 11) is called by step 206, during definition of an ICF catalog, VVDS 70 may not already exist or be open (see steps 240–244). The actual write of the VVR's of step 206 (FIG. 4) will occur in step 247 (FIG. 11).

In steps 207 and 208, BCS manager 32 builds in main storage 28 a BCS self-describing sphere record from user-specified parameters (see discussion of step 202) and relative byte addresses (RBA) returned from VVDS manager 34. The key of such a self-describing sphere record is all zeros to ensure it is the first record in the catalog. The data component name is the user-defined catalog name. In step 209, VSAM record manager 52 writes the self-describing sphere record 76 into BCS 60 on DASD 20.

Self-describing sphere record 76 is the sphere record in BCS 60 which points 73 to the VVR's 72, 77 describing the BCS 60 data set. It is, thus, a special case of the sphere records described in Tables 9–14, below.

TABLE 9
Sphere Record

| LENGTH | NAME CELL (Table 10) | OWNER CELL (Table 11) | SECURITY CELL (Table 12) | ASSOCIATION CELL (Table 13) |
|---|---|---|---|---|

CLUSTER COMPONENT

| NAME CELL (Table 10) | OWNER CELL (Table 11) | SECURITY CELL (Table 12) | VOLUME CELL (Table 14) | VOLUME CELL (Table 14) |
|---|---|---|---|---|

DATA COMPONENT

In Table 9, the sphere record is shown having a cluster component and a data component, and thus refers to a VSAM ESDS. A sphere record for a VSAM KSDS would further include an index component having a name cell (Table 10), owner cell (Table 11), security cell (Table 12), and a volume cell (Table 14). If the KSDS includes a sequence set which resides with the data component, an additional volume cell (Table 14) is provided for the index set. In Table 9, two volume cells (Table 14) are shown, one referencing a primary VVR and the other a non-primary VVR for a multi-volume data set.

TABLE 10
Sphere Record Name Cell

| CELL LEN | TYPE | COMP LEN | # EXT REC | KEY LEN | CLUSTER NAME | PAD |
|---|---|---|---|---|---|---|

| NAME | DESCRIPTION |
|---|---|
| CLCELLN | Name Cell length includes itself. |
| CLTYPE | Type 'C' for Cluster. |
| CLCOMPLN | Length of the Cluster component. |
| CLNOEXT | Number of Extension Records (240 max.). |
| CLNMLEN | Length of cluster key (45 bytes). |
| CLNAME | Cluster name is part of the key. |
| CLNMPAD | Pad character is also part of the key. |

TABLE 11
Sphere Record Owner Cell

| CELL LEN | TYPE | OWNER ID | FLAG | CREATION DATE | EXPIRATION DATE |
|---|---|---|---|---|---|

| NAME | DESCRIPTION |
|---|---|
| OWNCELLN | Ownership Cell length includes itself. |
| OWNTYPE | Type X'01' for Ownership Cell. |
| OWNID | Owner identification. |
| OWNFLAG | Flag Byte. |
| OWNRACF | RACF protected (VSAM only). |
| OWNKSDS | Index component present. |
| OWNREUS | Reusable data set. |
| OWNERASE | Erase specified (cluster only). |
| OWNNUSED | Currently not used. |
| OWNSWAP | Swapspace (Cluster only). |
| OWNPAGE | Pagespace (Cluster only). |
| OWNCREDT | Creation date. |
| OWNEXPDT | Expiration date. |

TABLE 12
Sphere Record Security Cell

| CELL LEN | TYPE | PASSWORDS | PROMT CODE | MAX NUM ATTMP | USER SEC VER MOD | AUTH RECD LEN | USER AUTHORIZATION RECD |
|---|---|---|---|---|---|---|---|

| NAME | DESCRIPTION |
|---|---|
| SECELLN | Security Cell length includes itself. |
| SECTYPE | Type X'02' for security. |
| SECPSWD | Passwords. |
| SECMSPSW | Master password. |
| SECCIPSW | Control interval processing password. |
| SECUPPSW | Update password. |
| SECRDPSW | Read password. |
| SECPMTCD | Password prompting code. |
| SECATMP | Maximum number of attempts. |
| SECVRMOD | User security verification module. |
| SECRCDLN | User authorization record length. |
| SECRCD | 1-256 byte user authorization record. |

TABLE 13

Sphere Record Association Cell

| CELL | T Y | C N | F L | KEY INFO | KEY INFO(1) | F L | KEY INFO | KEY INFO(n) |
|------|-----|-----|-----|----------|-------------|-----|----------|-------------|
| LEN | P E | T G | A | LEN (1) | | A G | LEN (n) | |

| NAME | DESCRIPTION |
|------|-------------|
| ASCLEN | Association Cell length includes itself. |
| ASCTYPE | Type X'03' for association. |
| ASCOUNT | Count of Associations. |
| ASKEYS | Array of length and key information. |
| ASCFLAG | Association key flag - (for relate cell). |
| ASCKYLEN | Length of condensed key. |
| ASCKEY | 1-45 byte condensed key. |

TABLE 14

Sphere Record Volume Cell

| CELL | T Y | R E | VOLSER | DEV | F L | F L | VVR RBA/ | R E | FILE | KEYRANGE QUALIFIER | LOW KEY | LOW | HI KEY | HIGH |
|------|-----|-----|--------|-----|-----|-----|----------|-----|------|--------------------|---------|-----|--------|------|
| LEN | P E | S V | | TYP | G 1 | G 2 | DSCB TTR | S V | SEQ | OR RESERVED | LEN | KEY | LEN | KEY |

| NAME | DESCRIPTION |
|------|-------------|
| VOLLEN | Volume Cell length includes itself. |
| VOLTYPE | Type X'04' for Volume. |
| VOLSERN | Volume serial number. |
| VOLDEVIP | Device type. |
| VOLFLAG1 | Volume flag. |
| VOLPRIME | Indicates a prime volume. |
| VOLCANDI | Indicates a candidate volume. |
| VOLOFLOW | Indicates an overflow volume. |
| VOLNVSAM | Indicates a non-VSAM volume. |
| VOLKYRNG | Indicates keyrange qualifier present. |
| VOLVPCI | Indicates primary VVR. |
| VOLSSQWD | Indicates sequence set with data. |
| VOLVVRBA | RBA of VVR. |
| VOLDSTTR | TTR of Format 1 DSCB for non-VSAM. |
| VOLFLSEQ | For non-VSAM a file sequence number. |
| VOLKRQL | Keyrange qualifier (VSAM only). |
| VOLLKYLN | Length of low key range key. |
| VOLLOWKY | 1-64 byte low key. |
| VOLHKYLN | Length of high key range key. |
| VOLHIKY | 1-64 byte high key. |

In FIGS. 6 and 7 the steps for defining or recataloging a VSAM data set into an ICF catalog are set forth.

In step 211, as will be more fully described in connection with FIG. 17, BCS manager 32 serializes write access to assure exclusive control for write. Further, in a multi-processing environment, the control block structure maintained at the CPU for the BCS must be updated to reflect changes previously made to the shared BCS by another CPU before proceeding to define or recatalog a data set.

In step 212, BCS manager 32 determines (by examination of user-provided data, field CTGFVRCT) if the data set is to be recataloged. If so, control is passed to VVDS manager 34 which will search the VVDS for the VVR's containing the key of the data set and return with the RBA's of the VVR's. In step 214, BCS manager generates the sphere record (see Tables 9-14) which, in step 223, is written out to DASD 20 in BCS 60. In step 224, serialization is released.

If the data set to be cataloged (by way of example, let that be data set having key K7, FIG. 3) is not being recataloged (step 212), in step 215 DADSM 36 is invoked to allocate space on volume 25 for the user VSAM data set (data component 152 and index component 151 on DASD volume 25, FIG. 3).

In step 216, data VVR record 121 is generated in main storage 28 by BCS manager 32. In the present example, the data set is a VSAM KSDS requiring an index component. Consequently, in decision step 217, control is passed to step 218, and BCS manager 32 generates index VVR record 120.

The format of VVR records 120 and 121 is shown in Table 7, with Tables 3-6 giving further definition of the VVR field contents.

In step 219 it is determined if the sequence set (lowest level of the index) is to reside on the same cylinder as the data. If so, in step 220 the sequence set VVR is generated by BCS manager 32.

In step 221, VVDS manager 34, to be more fully described in connection with FIG. 11, is invoked to write VVR records 120 and 121 from main storage 28 into VVDS 133 on DASD 25 (see step 247) and return to BCS manager 32 the RBA's of the VVR's.

In step 222, BCS manager 32 generates the data set sphere record 87 (Tables 9-14) from user-specified parameters in the catalog parameter list (Table 1), field vector table (Table 2), and the field parameter lists (see IBM Publication SY 26-3826), and from the RBA information returned from VVDS manager 34.

In Table 15, below, are set forth in pseudo code the process steps executed by the computing system under control of ICF Catalog 30 for defining a user data set, herein a VSAM data set, on a volume.

TABLE 15
ICF Catalog - VSAM Data Set Define Processing

320 Serialize the BCS for write access.
321 If the data set is to be recataloged, then
322 Call VVDS manager to read the VVR's for the data set.
323 Build the data set sphere record, using information
    from the VVR's and the RBA's
    returned by VVDS manager.
324 Else the data set is being defined for the first time.
325 Call DADSM to allocate DASD space for the data set.
326 Build the VVR for the data component of the data set,
    using information provided by the caller.
327 If the data set is to be key-sequenced, then
328 Build the VVR for the index component of the data
    set.
329 If the sequence set is to reside with the data
    component, then
330 Build the VVR for the sequence set.
331 Call VVDS manager to write the VVR's for the data set.
332 Build the data set sphere record, using information
    provided by the caller and the RBA's returned by
    VVDS manager.
333 Call VSAM record management to
    write the data sphere record.
334 Release BCS serialization.

Referring now to FIGS. 8-10, the operation of the computing system will be described for opening (preparing for reading or writing by the user's program) a VSAM data set. In step 225 the volumes containing the user data set are mounted, and in step 226 the BCS is serialized for read access (see FIG. 17). If, in step 227, it is determined that the catalog is not opened in steps 228, 237, and 238, VVDS manager (FIG. 11) is invoked (step 248) to retrieve the VVR's describing the BCS, and then the VSAM control blocks for the BCS are built, and the BCS is placed in an open state (available for read and write access).

In step 229, the data set sphere records are retrieved from BCS. In step 230, the sphere records are examined to fetch the VVR RBA's, and in step 231 VVDS manager 34 is invoked to retrieve and load into main storage 28 the VVR's associated with the sphere records. In step 232 it is determined whether the VVR RBA's were correct (see step 267, FIG. 13). If not, in step 233 the RBA's are corrected in the sphere record, and in step 234 the corrected sphere record is written out to BCS by VSAM record manager 52. In step 235, the catalog serialization is released, and in step 236 the VSAM data set control blocks are built in main storage 28 using data set characteristics from the VVR's. The data set is now opened.

Referring now to FIG. 11, the operation of VVDS manager 34 will be described. The caller of VVDS manager 34 supplies a parameter list (Table 15) with fields initialized according to the type of request.

In step 239, the VVDS manager allocates the volume containing or to contain the VVDS. In step 240 a determination is made if, for this request, a VVDS already exists. It would not exist, for instance, if the VVDS manager were being invoked to write VVR's to a new volume (one not already containing a VSAM data set). If the VVDS does not exist, DADSM 36 allocates space, and then, in step 242, VVDS manager 34 formats the VVDS, creates and writes, using the facilities of media manager 54, the volume control record VVCR and the VVDS self-describing VVR's.

The VVCR is described in Table 17. It is a space map for the VVDS, and includes a catalog entry identifying each BCS using that VVDS (by having data sets on the volume mapped by VVR's in the VVDS). The VVCR, for each control interval (CI) in the VVDS, contains a field indicating the number of bytes not used in the control interval. This permits VVDS manager 34 to find an area large enough to insert a new record or to move an updated VVR to a new location (due to length change). Another field in the VVCR contains a count of the control intervals in the VVDS, enabling VVDS manager 34 to handle multi-CPU cases. The VVCR also includes the flags, CI count, and entries identifying catalogs having entries in the VVDS. (Each entry includes catalog name and the RBA's of the BCS self describing VVR's for the data, index, and sequence set components, if present).

If, in step 243, it is determined that the VVDS is not already open, it is opened in step 244 by building in main storage 28 the control blocks required to allow access to the VVDS.

In step 245, the request is serialized, and in steps 246-249 the requested operation is performed. These will be further described in connection with FIGS. 13-14. In step 250, VVDS serialization is released.

TABLE 16

VVDS Manager Protocol Parameter List (VVDS PARM)

| FIELD NAME | DESCRIPTION |
|---|---|
| Header Section | |
| VDSRQTYP | Request type flags |
| VDSFREAD | Type READ |
| VDSFISRT | Type INSERT |
| VSDFDLET | Type DELETE |
| VDSGETUP | Type GET FOR UPDATE |
| VDSGENRD | Type GENERIC READ |
| VDSDELCT | Type DELETE CATALOG NAME |
| VDSENDUP | Type END UPDATE |
| VDSBCSOP | Type BCS OPEN |
| VDSGENDT | Type GENERIC DELETE |
| VDSPUTUP | Type PUT FOR UPDATE |
| VDSRETCT | Type RETURN CATALOG NAMES |
| VDSHRSVD | Reserved bytes |
| VDSUCBAD | Address of UCB (or DEVTYP if VDSDVTYP is set) |
| VDSVOLSR | Volume serial number |
| VDSFLAG1 | Volume section flags |
| VDSDVTYP | Indicates VDSUCBAD contains the device type |
| VVDSLNCHG | Indicates Get for Update with length change |
| VDSFRBA | Ptr to first RBA entry |
| RBA Section | |
| VDSNXRBA | Address of next RBA entry |
| VDSRBAFG | RBA entry flags |
| VDSNOSCH | Do not perform automatic search of VVDS if incorrect RBA passed |
| VDSCATLG | This VVR is for a Catalog |
| VDSCLUS | For Generic Read/Delete, treat component name field as 45 byte key (cluster name) |
| VDSERRFG | Error indicator |
| VDSERRBA | The RBA passed was incorrect. A correct RBA may be found in its corresponding VDSNWRBA field in this parameter list |
| VDSERBUF | The buffer provided for this entry is not sufficient. The correct length can be found in the corresponding VDSNWBFL field for this entry |
| VDSBUFLN | Length of buffer for this entry (see VDSBUFAD) |
| VDSBUFAD | Address of variable length buffer for this entry. For GENERIC READ, address of RBA table. |
| VDSRBA | RBA of CI containing desired record. |
| VDSNWRBA | Corrected RBA of CI |
| VDSCIPTR | Ptr to CI for Get for Update |
| VDSNWBFL | Corrected buffer length. |
| VDSCMPLN | Length of Component name for this entry up to 44 bytes). |
| VDSCMPNM | Component name. |
| VDSCATLN | Length of Catalog name for this entry. |
| VDSCATNM | Catalog name. |
| VDSLKRGL | Length of low Key Range for this entry. |
| VDSLKYRG | Low Key Range for this entry (variable |

TABLE 16-continued

VVDS Manager Protocol Parameter List (VVDS PARM)

| FIELD NAME | DESCRIPTION |
|---|---|
| | length). |

TABLE 17

Volume Control Record (VVCR) Layout
CATALOG ENTRY

| Flags | CI Count | Catalog Name | Data RBA | Index RBA | SEQ SET ... RBA | CI Space Map |
|---|---|---|---|---|---|---|

CATALOG ENTRY

As previously noted, VVDS manager 34 provides twelve types of requests for the caller (see Table 16), as follows:

(a) READ (retrieve one to eight VVR's from VVDS)
(b) INSERT (add one VVR to VVDS)
(c) DELETE (remove one VVR from VVDS)
(d) GET FOR UPDATE (get VVR to be updated)
(e) PUT FOR UPDATE (write changed VVR)
(f) GENERIC READ (read all VVR's matching generic key)
(g) GENERIC DELETE (delete all VVR's matching generic key)
(h) EXPLICIT DEFINE OF VVDS (user requests definition of VVDS)
(i) BCSOPEN (used in conjunction with opening an ICF Catalog)
(j) DELETE CATALOG (allows Catalog name deletion in VVCR)
(k) END UPDATE (used to abort a GET/PUT UPDATE request)
(l) RETURN CATALOG NAMES (returns all Catalog names from VVCR)

The following paragraphs describe the parameter list settings (Table 16) for each of the different request types.

READ

Read returns from 1 to 8 VVR's specified in the RBA entries in the parameter list. The header portion of the parameter list is initialized and one RBA entry is included for each VVR requested. The RBA entries are initialized as follows:

| (a) VDSNXRBA | points to next RBA entry or zero if end of chain. |
|---|---|
| (b) VVDSBUFLN | set to length of buffer to receive VVR. |
| (c) VDSBUFAD | set to address of buffer to receive VVR. |
| (d) VDSRBA | set to RBA of CI containing the VVR to be read. |
| (e) VDSCMPLN | set to number of characters to use in next field (VDSCMPNM). |
| (f) VDSCMPNM | set to component name for desired VVR. |
| (g) VDSCATLN | set to zero (catalog name not required on READ). |
| (h) VDSLKRGL | set to number of characters in keyrange if a particular keyrange is desired. |
| (i) VDSLKYRG | set to keyrange if a particular keyrange is desired. |
| (j) VDSSEQS | set to on to read sequence set VVR for specified component. |

The desired VVR (based on component name and keyrange (if specified) is returned in the caller supplied buffer (including the length).

INSERT

Insert adds one VVR to specified VVDS. Only one RBA entry is used and the header portion of the parameter list is initialized. The RBA entry is initialized as follows:

| (a) VDSNXRBA | set to zero. |
|---|---|
| (b) VDSCATLG | set to one if specified VVR is for a catalog. |
| (c) VDSBUFLN | set to length of buffer containing VVR. |
| (d) VDSBUFAD | set to address of a buffer containing the VVR to be inserted (including the length of the VVR). |
| (e) VDSCATLN | set to number on characters to use in next field (VDSCATNM). |
| (f) VDSCATNM | set to catalog name. |

Upon successful return from VVDS Manager, the following field is initialized:

| (a) VDSNWRBA | set to the RBA of the CI in which the VVR was inserted. |
|---|---|

DELETE

Delete deletes from one to eight VVR's specified in the RBA entries in the parameter list. The header portion of the parameter list is initialized and one RBA entry is included for each VVR to be deleted. The RBA entries are initialized as follows:

| (a) VDSNXRBA | points to next RBA entry or zero if end of chain. |
|---|---|
| (b) VDSCATLG | set to one if specified VVR is for a catalog. |
| (c) VDSRBA | set to RBA of CI containing VVR to be deleted. |
| (d) VDSCMPLN | set to number of characters in next field (if deleting a non-catalog VVR). |
| (e) VDSCMPNM | set to component name (if deleting a non-catalog VVR). |
| (f) VDSCATLN | set to number of characters in next field. |
| (g) VDSCATNM | set to catalog name (if deleting a catalog VVR). |
| (h) VDSLKRGL | set to number of characters in next field. |
| (i) VDSLKYRG | set to low keyrange to delete a specific keyrange VVR (if deleting a non-catalog VVR). |

GET for UPDATE

GET for UPDATE returns one VVR specified in an RBA entry to be updated. The header portion is initialized and one RBA entry is specified. The RBA entry is initialized as follows:

| (a) VDSNXRBA | set to zero. |
|---|---|
| (b) VDSCATLG | set to 1 if VVR is for a catalog. |
| (c) VDSBUFLN | set to length of buffer to receive VVR. |
| (d) VDSBUFAD | set to address of buffer to receive VVR. |
| (e) VDSRBA | set to RBA of CI containing VVR to be read. |
| (f) VDSCMPLN | set to number of characters in next |

-continued

| | | |
|---|---|---|
| | | field. |
| (g) | VDSCMPNM | set to component name. |
| (h) | VDSCATLN | set to number of characters in next field. |
| (i) | VDSCATNM | set to catalog name. |
| (j) | VDSLKRGL | set to number of characters in next field (if keyrange is desired). |
| (k) | VDSLKYRG | set to keyrange desired. |

This request type is specified in conjunction with PUT for UPDATE. This same parameter list is used for the PUT for UPDATE call. (The field VDSCIPTR contains information which is passed between the GET and PUT calls.) The field VDSLNCHG is set to one if the update process includes changing the length of the VVR.

PUT for UPDATE

PUT for UPDATE writes out the updated VVR specified in an RBA entry. The header portion of the parameter list is initialized and one RBA entry is specified. The RBA entry is initialized as follows:

| | | |
|---|---|---|
| (a) | VDSNXRBA | set to zero. |
| (b) | VDSCATLS | set to one if VVR is for a catalog. |
| (c) | VDSBUFLN | set to length of buffer containing VVR. |
| (d) | VDSBUFAD | set to address of buffer containing VVR. |

END UPDATE

END UPDATE frees buffers and control blocks associated with a GET for UPDATE request which is being aborted. It performs cleanup operations such as DEQing any resources obtained during previous GET for UPDATE request. The header portion of the parameter list is initialized and one RBA entry is specified. The parameter list is the same one that was used for the previous GET for UPDATE request since it contains information needed between calls. No fields in the RBA entry need be initialized.

BCSOPEN

BCSOPEN returns all VVR's and their RBA's (data, index, and sequence set (if it exists), in that order). The header portion is initialized and three RBA entries are specified. The RBA entries are initialized as follows:

| | | |
|---|---|---|
| (a) | VDSNXRBA | set to address of next RBA entry or zero if last one. |
| (b) | VDSBUFLN | set to length of buffer to receive VVR. |
| (c) | VDSBUFAD | set to address of buffer to receive VVR. |
| (d) | VDSCMPLN | set to 0. |
| (e) | VDSCATLN | set to number of characters in next field (specify only in first RBA entry). |
| (f) | VDSCATNM | set to catalog name. |

The VVDS manager returns the following information, as well as the VVR's themselves in the supplied buffers:

| | | |
|---|---|---|
| (a) | VDSNWRBA | set to the RBA of the CI containing the desired VVR. |

DELETE CATALOG NAME

The specified catalog name is deleted from the VSAM Volume Control Record if no VVR's can be found in the VVDS that belong to the catalog name being deleted. The header portion of the parameter list is initialized and one RBA entry is specified. The RBA entry is initialized as follows:

| | | |
|---|---|---|
| (a) | VDSNXRBA | set to zero. |
| (b) | VDSCMPLN | set to zero. |
| (c) | VDSCATLN | set to number of characters in the next field. |
| (d) | VDSCATNM | set to catalog name to be deleted. |

RETURN CATALOG NAMES

Returns the portion of the VSAM Volume Control Record (Table 17) containing the list of catalog names. The header portion is initialized and one RBA entry is specified. The RBA entry is initialized as follows:

| | | |
|---|---|---|
| (a) | VDSNXRBA | set to zero. |
| (b) | VDSBUFLN | set to length of buffer to contain the list of catalog names. |
| (c) | VDSBUFAD | set to address of buffer to contain the list of catalog names. |

GENERIC READ

GENERIC READ returns an array of generic read entries of the following format:
 (1) length of a VVR.
 (2) the RBA of the VVR.
 (3) a flag indicating primary or secondary VVR and data or index VVR.
 (4) the VVRAMATR byte from the AMDSB.

VVDS manager scans the entire VVDS for any VVR's matching the desired specifications. The above information is supplied by VVDS manager for each VVR specification match (key match). The header portion of the parameter list is initialized and one RBA entry is specified. The RBA entry is initialized as follows:

| | | |
|---|---|---|
| (a) | VDSNXRBA | set to zero. |
| (b) | VDSBUFLN | set to length of buffer to contain the generic read entries. |
| (c) | VDSBUFAD | set to address of buffer to contain the generic read entries. |
| (d) | VDSCMPLN | set to number of characters in next field. |
| (e) | VDSCMPNM | set to component name. |
| (f) | VDSCATLN | set to number of characters in next field. |
| (g) | VDSCATNM | set to catalog name. |

The generic search key consists of the VDSCMPNM field (if specified) and the VDSCATNM field (if specified). If the search is to be performed by catalog name only, VDSCMPLN is set to zero and the catalog name specified in VDSCATNM. If the search is to be performed by component name only, VDSCMPNM is initialized and VDSCATLN set to zero. If both fields are to be used as a key, then both fields are initialized.

In general, the length fields are initialized for the key entries. For example, if no Key Range is to be specified as part of the key, the length must be set to 0 to indicate a zero length. For multiple key requests, the VVDS manager searches the variable section of the parameter list for each of the 3 parts of the key.

If the RBA specified is incorrect, VVDS manager 34 automatically searches the entire VVDS for a VVR matching the specified key. This situation can occur if the VVR has been moved into a different CI due to an update request with a length change. The new (updated) VVR may be too long to fit back in the same CI, which forces the VVDS manager to find a new CI in which to place the record. The RBA of the CI in which the updated record is placed is returned in the VDSNWRBA field of the current entry and the VDSERRBA bit in VDSERRFG is set. If the VVR cannot be found during the search, an error indication is returned. The user may suppress the automatic search by setting the VDSNOSCH bit in the VDSENTFG for the current entry. If the caller does not know the RBA of the CI needed, or wants VVDS manager to search the entire VVDS, the caller supplies an RBA of zero. If the buffer passed to VVDS manager (by the caller) is not large enough to contain the VVR requested, the VDSERBUF bit in VDSERRFG is set, and the correct buffer length needed will be placed in the current entry's VDSNWBFL field. The caller must then call VVDS manager again providing the proper record length.

The caller indicates the type of call by initializing VDSRQTYP. The field VDSUCBAD may be initialized to contain a UCB address (if known) or the device type (from the Catalog). If a device type is specified, the bit VDSDVTYP in VDSFLAG1 is also set. In this case, VVDS manager will handle allocating a unit and mounting/verifying the correct volume when necessary. If a UCB address is specified, VVDS manager 34 assumes that the device is allocated to this job step and proceeds accordingly. The volume serial number must always be specified in order that VVDS manager may ensure that the proper volume is being used. The only other field in the Header Cell is VDSLNCHG in VDSFLAG1 which is initialized for GET/PUT for UPDATE requests. It is set to 1 if the length of the VVR is to be changed (eg.: data set extend).

The field VDSNXRBA is initialized to point to the next RBA entry or zero if no more entries. The VDSNOSCH bit in VDSRBAFG may be set to 1 if the caller wants to suppress the VVDS automatic search function. The VDSCATLG bit in VDSRBAFG must be set during INSERT, DELETE, and GET/PUT UPDATE calls to indicate that the VVR is for a catalog. The field VDSBUFAD will normally point to a buffer that contains a VVR to be written, or that is to be used to place the VVR during a read operation.

For the Rename Catalog call, VDSBUFAD will point to the new catalog name and VDSCATNM will contain the old catalog name. For Get for Update calls with no length change (eg.: VDSLNCHG=OFF), VDSBUFAD points to a 4K (CI size) buffer. VVDS manager reads the VVR and moves it into the buffer. The caller then modifies the VVR and calls VVDS manager for Put for Update (using the same parameter list as was used in the Get for Update call previously). The field VDSRBA must be initialized to the RBA of the CI containing the desired VVR for READ, GET for UPDATE, DELETE, and PUT for UPDATE calls.

In Table 18 below, are set forth in pseudo code the process steps executed by the computing system under control of VVDS manager 34 for building and opening a VVDS and for invoking a requested VVDS function (read, write, etc.).

TABLE 18

VVDS Manager

340 Request dynamic allocation to ensure that the required volume is available.
341 If the required VVDS is not already open, then
342 If there is no VVDS on the volume, then
343 Call DADSM to allocate DASD space for the VVDS.
344 Build the control blocks required to access the VVDS; i.e. Open the VVDS.
345 If the VVDS has not already been preformatted, then
346 Call media manager to preformat the VVDS.
347 Build a VVCR and a VVDS self-describing VVR.
348 Call media manager to write the VVCR and the self-describing VVR.
349 Serialize VVDS access appropriately for this request.
350 Invoke the requested VVDS function (read, write, BCS open, etc.)
351 Release VVDS serialization.

Figure 12:
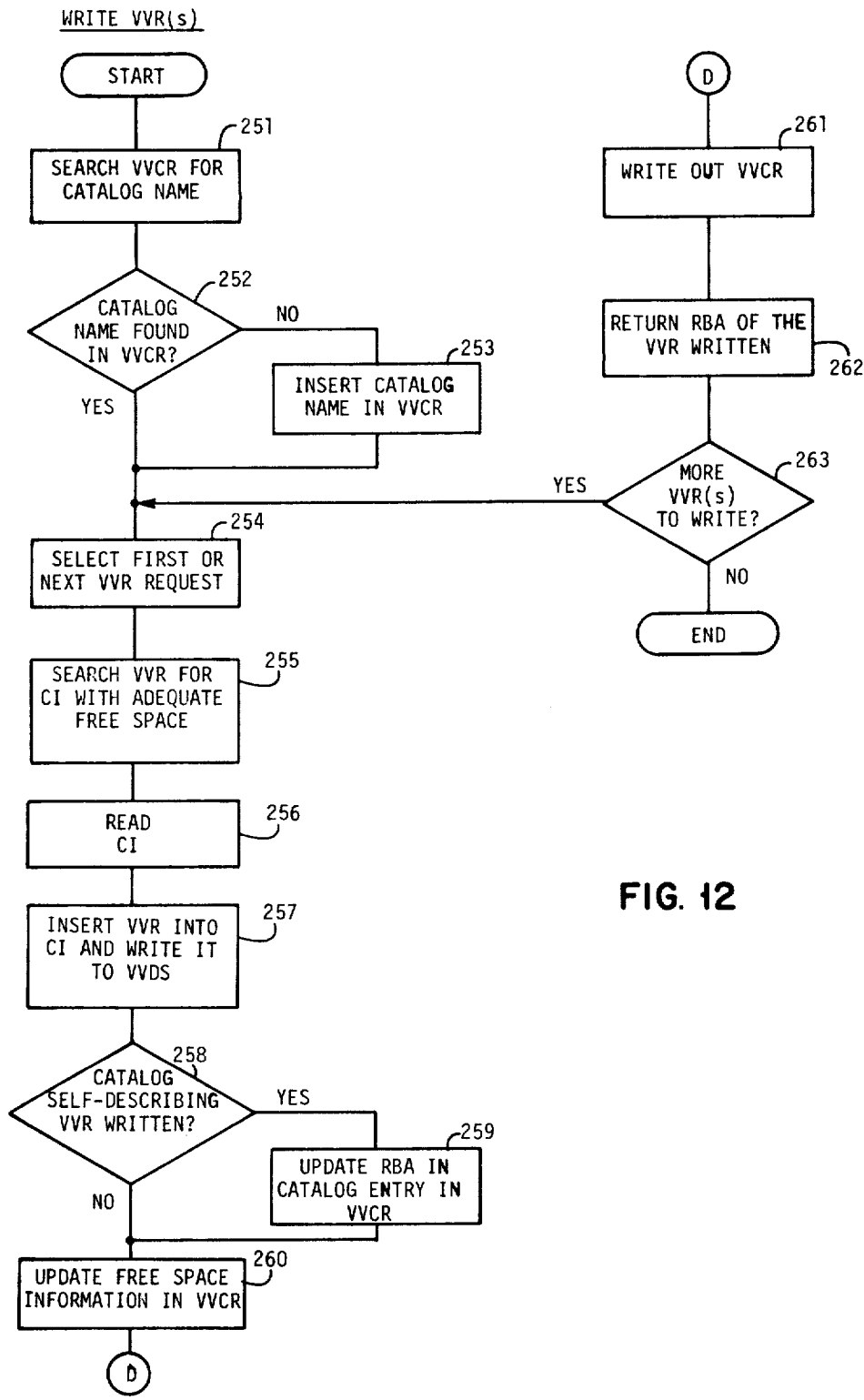
FIG. 12 is a flow chart representation of the method steps to write VVR's.

Referring now to FIG. 12, the operation of VVDS manager 34 is described for those requests which require that a VVR be written into the VVDS, including INSERT and PUT for UPDATE.

In step 251, the VVCR (Table 17) is read into main storage 28, and then searched for the catalog name VDSCATNM in the VVDSPARM (Table 16). If, in step 252, the catalog name is not found in the VVCR, in step 253 the catalog entry is made in VVCR (Table 17).

In step 254, the next VVR to be written is selected, as a user may pass a number of such VVR's to the VVDS manager for writing. In step 255, the VVCR (Table 16) is searched for a control interval (CI, which is the smallest unit of addressable space) containing sufficient free space for the VVR. The selected control unit is read, in step 256, into main storage 28. In step 257, the VVR is written into the control interval record in the VVDS on DASD. For this purpose, VVDS 34 passes control to media manager 54.

In step 258, the VDSCATLG bit in VVDSPARM is tested to determine if the VVR to be written is a catalog self-describing VVR 72, 73. If so, in step 259, the RBA entries for the catalog are updated in the VVCR. These RBA records are needed for bootstrapping to open a BCS.

In step 260, the free space information for the control interval containing the VVR is updated. In step 261, the VVCR is written out to DASD. In step 262, the RBA of the VVR is returned to the caller of VVDS manager so that information can be written into the sphere record for the data set described by the VVR.

In step 263, if more VVR's are to be written, steps 254–262 are repeated.

In Table 19 below, are set forth in pseudo code the process steps executed by the computing system under control of VVDS manager 34 for processing a write request.

TABLE 19

VVDS Manager - Write Request Processing

370 Allocate the VVDS on the correct volume and serialize for write access.
371 Call media manager to retrieve the VVCR.
372 Do for each VVR to be written:
373 Search the space map in the VVCR for a CI with sufficient free space for the VVR.
374 Call media manager to retrieve the selected CI.
375 Return the RBA of the CI.
376 Search the VVCR for the catalog name.

TABLE 19-continued

VVDS Manager - Write Request Processing

377 If the catalog name is not in the VVCR, then
378 Insert the catalog name into the VVCR.
379 If the VVR to be written is for the catalog, then
380 Update the appropriate RBA in the catalog entry in the VVCR.
381 Copy the VVR into the selected CI.
382 Update the space map in the VVCR.
383 Call media manager to write the VVCR and the new VVR.
384 End.
385 Release VVDS serialization.

Figure 13:
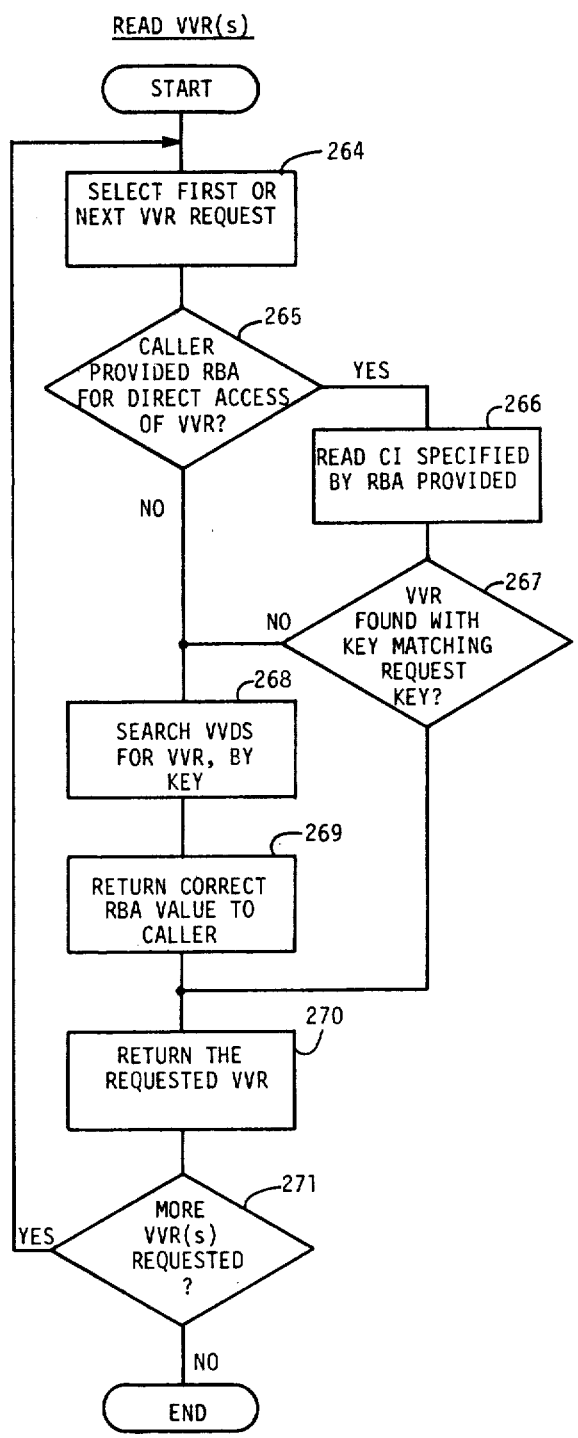
FIG. 13 is a flow chart representation of the method steps to read VVR's.

Referring now to FIG. 13, the operation of VVDS manager 34 is described for those requests which require that a VVR be read into main storage 28, including READ, GENERIC READ, and GET for UPDATE. This is necessary for the user to obtain from the VVR the information required to open data set(s).

As the user can request that a plurality of VVR's be read by specifying a plurality VDSCMPNM data set name (or key) and VDSRBA address pointers, in step 264 the first or next VVR request is selected. In step 265, it is determined if the caller provided the RBA (field VDSRBA) for direct access of the VVR. If so, then in step 266 the control interval CI specified by field VDSRBA is read into main storage 28. In step 267 the VVR key field VVRKEY (Table 3) is compared with the key field VDSCMPNM provided in VVDS Manager Protocol Parameter List (VVDSPARM, Table 16) by the requester. If these match, in step 270 the requested VVR is loaded into the buffer specified by the requester in fields VDSBUFAD (address) and VDSBURLN (length) in VVDSPARM, Table 16. If more VVR's have been requested, step 271 returns control to step 264 to repeat the process.

If, in step 267, the keys (VVRKEY and VDSCMPNM) do not match, as is expected, for example, when the catalog pointers are not updated following a relocation of the VVR, then it is necessary (unless the requester suppresses the search) to key search in step 268, VVDS for the correct VVR. When it is found, the RBA of the control interval containing the correct VVR is loaded in step 269 into VDSNWRBA (Table 16) and thus returned to the requester for updating field VOLVVRBA of the sphere record for the data set (Table 14).

By way of further explanation, the machine-implemented method of the invention will be described in Table 20 in a pseudo code listing which, as is apparent to those skilled in the art, can be converted into a compilable language, such as PL/1, without undue experimentation.

TABLE 20

VVDS Manager, Read Request Processing

400 Allocate the VVDS on the correct volume and serialize (Table 18, line 6376) for read access.
401 Do for each VVR requested:
402 If the caller specified an RBA for the VVR, then
403 If the CI identified by the RBA is not already in storage, then
404 Set up a buffer for the desired CI.
405 End.
406 If any CI's have been identified which must be read, then,
407 Call Media Manager to retrieve the CI's.
408 Do for each VVR requested:
409 If the caller specified an RBA for the VVR, then
410 Look for the VVR in the specified CI.
411 If the VVR is in the CI, then

TABLE 20-continued

VVDS Manager, Read Request Processing

412 Indicate VVR found.
413 Else VVR not found
414 Indicate the caller's RBA is incorrect.
415 End.
416 Do for each CI in the VVDS until all CI's processed or all VVR's found.
417 If the next CI is not already in storage, then call Media Manager to retrieve the CI.
418 Do for each VVR not already found:
419 Look for the VVR in CI
420 If VVR is in the CI, then Indicate VVR found.
421 End.
422 End.
423 Do for each VVR requested:
424 If the VVR was found, then
425 If the caller's RBA was incorrect, or if the caller did not specify an RBA, then
426 Return the correct RBA value.
427 Copy the VVR into the caller's buffer.
428 Else the VVR was not found.
429 Return the VVR-not-found code.
430 End.
431 Release VVDS serialization.

Figure 14:
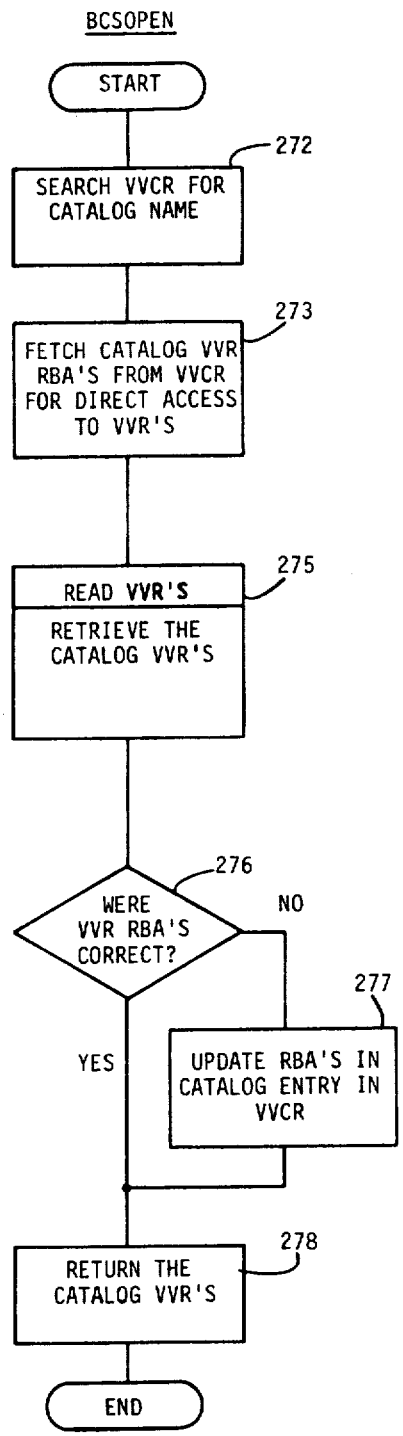
FIG. 14 is a flow chart representation of the method steps to open BCS.

Referring now to FIG. 14, the operation of VVDS manager 34 is described for the BCSOPEN request. In a situation where a user cannot get to the sphere record of his catalog to get the RBA's of VVR's describing his catalog, the BCSOPEN request is made (e.g. the BCS, which contains the self-describing catalog sphere record, is not in an open state, and the VVR's describing the BCS are required to open the BCS). In step 272, the VVCR (Table 17) is searched for the catalog name VDSCATNM provided in the VVDSPARM (Table 16). Once found, in step 273, the DATA RBA, INDEX RBA, and SEQSET RBA (see Table 17) for that catalog name are loaded into VDSNWRBA fields (Table 16).

In step 275, READVVR (FIG. 13) is invoked using as RBA's those obtained from the VVCR in step 273 to retrieve the self-describing catalog data, index, and sequence set VVR's.

In step 276, as the RBA's in the VVCR could have been bad, a test is made of field VDSERRBA in the VVDSPARM (Table 16). If the VVR RBA's were not correct, in step 277 these are updated in the VVCR from the VDSNWRBA field (Table 16).

In step 278 the catalog VVR's are returned to the requester in the buffers specified by the VDSBUFLN and VDSBUFAD fields.

FIGS. 15 and 16 describe the operation of the computing system for extending a VSAM data set. In this processing, VVR logical records within the VVDS can be physically moved to different locations within the VVDS; whenever this happens, the new location within the VVDS is updated in the BCS sphere record. A system failure after a VVR move, but prior to updating the BCS sphere record, can leave a down-level VVR pointer in the BCS. This type of error is dynamically corrected by the method of the invention, having particular reference to the operation of FIG. 13, steps 266-269 and FIG. 6, steps 211-214.

In step 279, DADSM is invoked to allocate additional space to the data set to be extended, and in step 280 to obtain extent information from VTOC for that additional space, as well as all previously existing space.

In step 281, VSAM record manager 52 is invoked to search BCS to obtain the sphere record for the data set to be extended, which is stored in main storage 28.

In step 282, the extent information in the VVR is updated according to the method of FIG. 16. If, as is determined in step 283, the data component is being extended and the sequence set is located on the same cylinders as the data component, then in step 284 the sequence set VVR extent information is also updated.

In FIG. 16, the detailed steps for steps 282, 284 (FIG. 15) are set forth. In step 285, the sphere record read into main storage 28 is examined to obtain the VVR RBA for the data set component (data, index, or sequence set) being extended.

In step 286, VVDS manager 34 is invoked to read (FIG. 13) the VVR, which, in step 287, is updated to add extent information obtained in step 280 from VTOC describing the new allocation of the data set. In step 288, VVDS manager 34 is invoked to write (FIG. 12) the updated VVR. In step 262 (FIG. 12) the RBA of the written VVR is returned, and in step 289 it is determined if the VVR moved to a new location. If so, in step 290 the RBA in the volume cell of the sphere record is updated, and in step 291 written back out to the BCS data set.

If a system failure occurs between steps 288 and 291, the sphere record volume cell will include an RBA which is not correct for the moved VVR. This possible lack of synchronization is handled in an advantageous way by the method of the invention.

Figure 17:
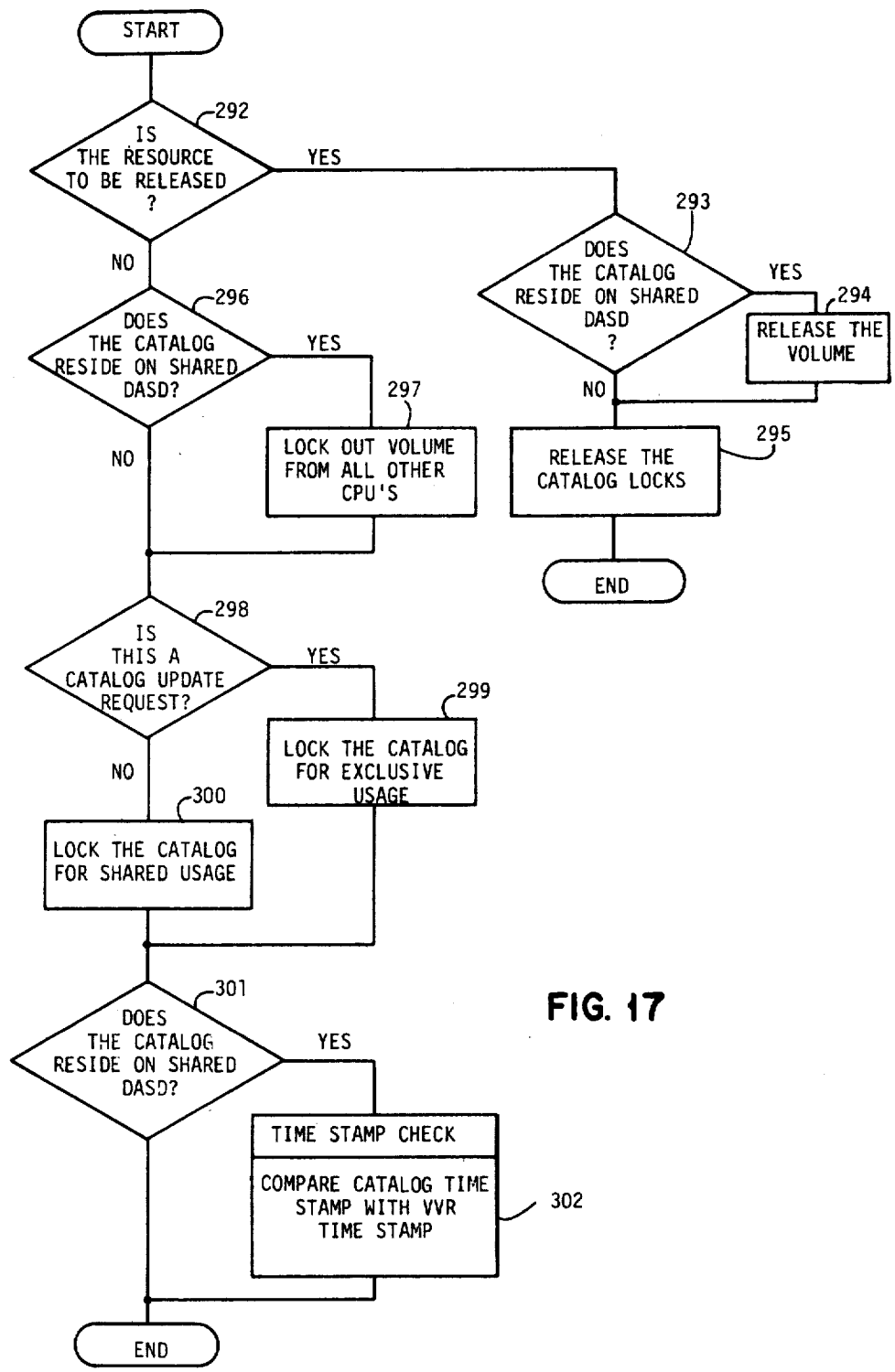
FIGS. 17 and 18 are flow chart representations of the method steps for catalog serialization.
Figure 18:
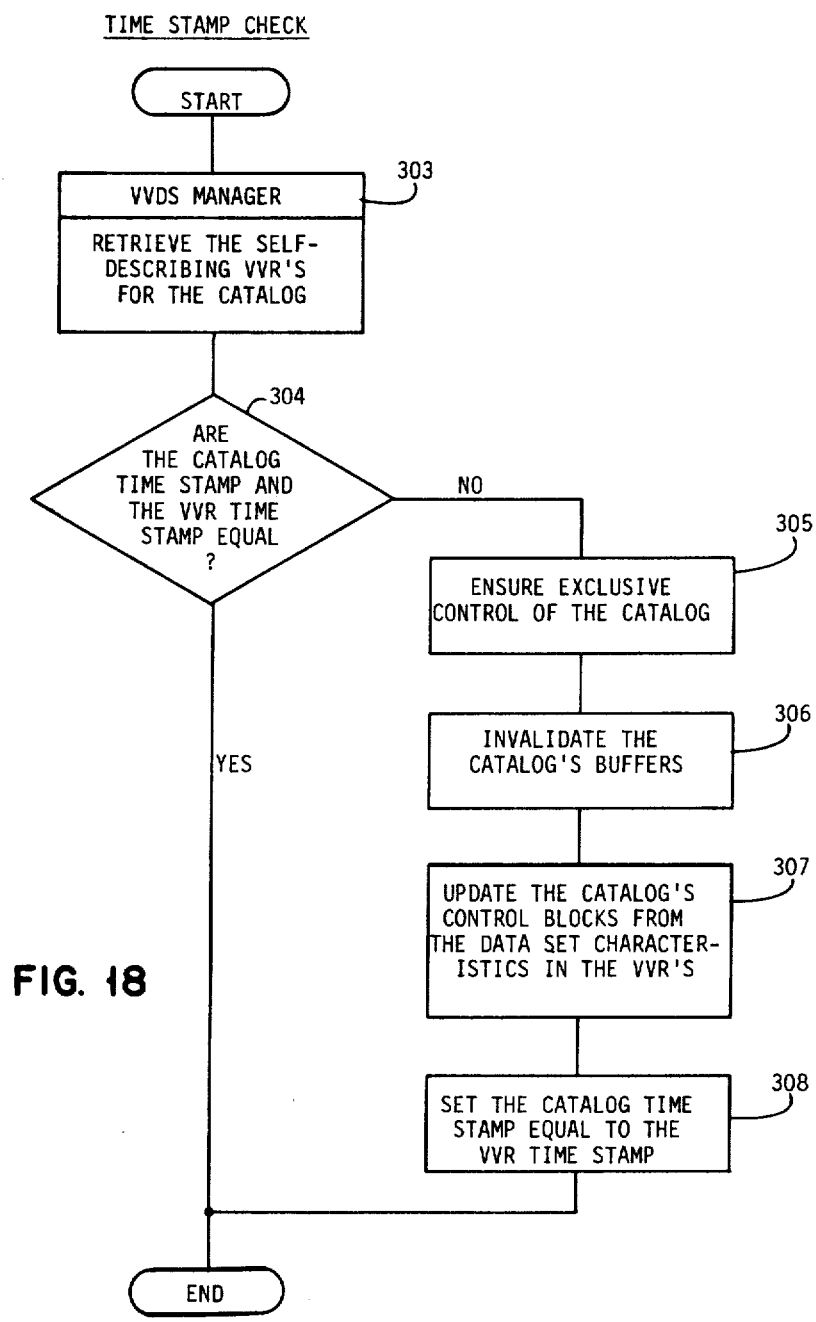

Referring now to FIGS. 17, 18, the catalog serialization routine which enables loosely coupled CPU's 29, 26 to share a catalog 60 and consequently the cataloged data sets, will be described. Each CPU 29, 26 maintains in its own main storage 27, 28 CPU catalog control blocks, created to describe catalog 60 when the CPU opens it. If CPU 29 writes into (or extends) catalog 60, altering its characteristics, the catalog control blocks in main storage 28 become obsolete. Also, if CPU 29 causes the relocation of a VVR and then crashes before updating BCS 60, the catalog control blocks in main storage 28 are not down level, but BCS 60 is not synchronized with respect to the VVR. Consequently, in accordance with the invention, under the control of their respective ICF 30, CPU's 29 and 26 are operated to assure the integrity of BCS 60.

Upon entering the catalog serialization procedure, in step 292, it is determined if the resource is to be released or locked. If it is to be released, and if (step 293) it is a catalog residing on shared DASD (such as is shown in FIG. 1, DASD 20), the volume is released in step 294. In step 295, the catalog locks are released, and the catalog is available for locking by another loosely coupled CPU or (in a single processor, multi-programming environment) by another application.

If the resource is to be locked (for shared or for exclusive usage), in step 296 it is determined if the resource (catalog) resides on shared DASD, thus loosely coupling two or more CPU's. If so, in step 297 the volume on which it resides is locked out from all CPU's other than that CPU performing serialization. In step 298, it is determined if the request is for updating the catalog and, if so, in step 299 the catalog is locked for exclusive usage. Otherwise, in step 300, the catalog is locked for shared usage. With the catalog locked, and if it resides on shared DASD (step 301), then in step 302 the time stamp check of FIG. 18 is performed. In step 303, VVDS manager 34 is called to retrieve self-describing VVR's for the catalog, and in step 304 the catalog time stamp and the VVR time stamp are compared. If not equal, steps 305–308 are performed to ensure exclusive control of the catalog, invalidate the catalog buffers, update the catalog control blocks from the data set characteristics in the VVR's, and set the catalog time stamp equal to the VVR time stamp.

Having described the invention with respect to the system environment, the method steps performed by such a system, and in machine and programming language independent pseudo-code, the method of the invention will be next described in a high-level procedure oriented language, similar to PL/1 that is readily converted into machine instructions by compilers and linkage editors. Compiler and linkage editor design for PL/1 type languages are well within the state of the art and beyond the scope of this invention. It is believed that a proper appreciation of the invention, method and means for cataloging data sets, would be enhanced by describing a typical VVDS manager having the responsibility of locating a volume record (VVR) and returning the same to the user. This VVDS manager is set forth in sequences of PL/1 type language in Tables 21–23 for reading a VVR, and corresponds generally to the method described in FIG. 13 and Table 20.

TABLE 21

VVDS Manager Process A Read Request
(Module IGGOCLE0)

| | | | |
|---|---|---|---|
| 6305 | IGGPVRED: | | |
| 6306 | PROC OPTIONS(NOSAVEAREA,NOSAVE): | /* SPECIFY PROCEDURE OPTIONS | */ |
| 6555 | R1=1; | /* GET ONE BUFFER | */ |
| 6556 | CALL IGGPVGWA; | /* | */ |
| 6367 | VWOENQS=ON; | /* ENQ SHARED | */ |
| 6376 | CALL IGGPVALO: | /* ALLOC VVDS AND ENQ SHARE | */ |
| 6377 | ZRENTRYP=VDSFRBA; | /* FIRST VVR ENTRY | */ |
| 6378 | RFY | | |
| 6379 | VDSENTRY BASED(ZRENTRYP); | | |
| 6380 | ZR1=1; | /* FIRST WA VVR ENTRY | */ |
| 6381 | DO WHILE ZRENTRYP≠0; | /* FOR ALL ENTRIES | */ |
| 6382 | DO VWCMPLN(ZR1)=VDSCMPLN TO 1 BY −1 WHILE | | |
| 6383 | VDSCMPNM(VWCMPLN(ZR1))=''; | /* SET COMPRESSED COMPONENT | |
| 6384 | | NAME LENGTH IN VVR ENTRY | */ |
| 6385 | END; | | |
| 6386 | IF VDSSEQS=ON THEN | /* IF SEQUENCE SET VVR WANTED | */ |
| 6387 | DO; | | |
| 6388 | VWVSINDX(ZR1)=ON; | /* SEARCH FOR INDEX VVR | */ |
| 6389 | VWVSSEQS(ZR1)=ON; | /* SEARCH FOR SEQUENCE SET VVR | */ |
| 6390 | END; | | |
| 6391 | VWENTRYP(ZR1)=ZRENTRYP; | /* ADDRESS OF PARM LIST ENTRY | */ |

TABLE 21-continued
VVDS Manager Process A Read Request
(Module IGGOCLE0)

| | | | |
|---|---|---|---|
| 6392 | VWVRBA(ZR1)=VDSRBA; | /* RBA PASSED | */ |
| 6393 | IF VWVRBA(ZR1)--=0 THEN | /* IF NOT ZERO | */ |
| 6394 | VWVFCRBA(ZR1)=ON; | /* READ PASSED RBA FIRST | */ |
| 6395 | ELSE | | |
| 6396 | VWVRBA(ZR1)=VVVRFST; | /* START SEARCH AT FIRST | |
| 6397 | | USER CI | */ |
| 6398 | IF VDSNOSCH=ON THEN | /* IF NOT TO AUTO SEARCH | */ |
| 6399 | VWVFNOSC(ZR1)=ON; | | |
| 6400 | VWVFRD(ZR1)=ON; | /* VVR SHOULD BE READ | */ |
| 6401 | VWVSCOMP(ZR1)=ON; | /* SEARCH BY COMPONENT NAME | */ |
| 6402 | IF VDSLKRGL--=0 THEN | /* IF LOW KEYRANGE SPECIFIED | */ |
| 6403 | VWVSLOKR(ZR1)=ON; | /* SEARCH ON IT | */ |
| 6404 | ZRENTRYP=VDSNXRBA; | /* NEXT VVR ENTRY | */ |
| 6405 | ZR1=ZR1+1; | /* NEXT WA VVR ENTRY | */ |
| 6406 | END; | | |
| 6414 | CALL IGGPVRDX; | /* READ THE VVRS | */ |
| 6415 | ZRENTRYP=VDSFRBA; | /* FIRST VVR ENTRY | */ |
| 6416 | ZR2=1; | /* FIRST WA VVR ENTRY | */ |
| 6417 | DO WHILE ZRENTRYP--=0; | /* FOR ALL ENTRIES | */ |
| 6418 | IF VWVFINCR(ZR2)=ON THEN | /* IF RBA PASSED INCORRECT | */ |
| 6419 | DO; | | |
| 6420 | VDSERRBA=ON; | /* SET INCORRECT IN PARM | */ |
| 6421 | VDSNWRBA=VWVRBA(ZR2); | /* NEW RBA | */ |
| 6427 | END; | | |
| 6428 | IF VWVFZIP(ZR2)=OFF THEN | /* IF VVR FOUND | */ |
| 6429 | DO; | | |
| 6442 | R0=VDSBUFAD; | /* POINT TO USERS BUFFER | */ |
| 6443 | R8=VWVVVRP(ZR2); | /* ADDRESS OF VVR IN CI | */ |
| 6444 | R9=R8->VVRLEN; | /* SIZE OF VVR | */ |
| 6445 | IF VDSBUFLN>=VWVVVRP(ZR2)->VVRLEN THEN | /* IF COMPLETE VVR | |
| 6446 | | WILL FIT IN USERS BUFFER | */ |
| 6447 | R1=R9; | /* SIZE OF VVR | */ |
| 6448 | ELSE | /* USERS BUFFER TOO SMALL | */ |
| 6449 | DO; | | |
| 6450 | R1=VDSBUFLN; | /* MOVE ALL THAT WILL FIT | */ |
| 6451 | VDSERBUF=ON; | /* SET INCORRECT IN PARM | */ |
| 6452 | VDSNWBFL=VWVVVRP(ZR2)->VVRLEN; | /* CORRECT LEN | */ |
| 6458 | END; | | |
| 6459 | MVCL(R0,R8); | /* MOVE VVR TO USERS BUFFER | */ |
| 6465 | END; | | |
| 6466 | ELSE | /* VVR NOT FOUND | */ |
| 6467 | DO; | | |
| 6481 | CALL IGGPVXIT; | /* EXIT TO CALLER | */ |
| 6482 | END; | | |
| 6483 | ZRENTRYP=VDSNXRBA; | /* NEXT VVR ENTRY | */ |
| 6484 | ZR2=ZR2+1; | /* NEXT WA VVR ENTRY | */ |
| 6485 | END; | | |
| 6494 | CALL IGGPVXIT; | /* EXIT | */ |
| 6500 | END; | /* END OF INNER PROCEDURE | */ |

TABLE 22
VVDS Manager Read VVR's
(Module IGGOCLE2)

| | | | |
|---|---|---|---|
| 6478 | IGGPVRDX: | | |
| 6479 | PROC OPTIONS(NOSAVEAREA,NOSAVE); | /* SPECIFY PROCEDURE OPTIONS | */ |
| 6574 | ZRFRD=OFF; | /* RESET FLAG | */ |
| 6575 | DO ZR1=1 TO DIM(VWVVRSEC); | /* FOR ALL VVR ENTRIES | */ |
| 6576 | VWVRELP(ZR1)=0; | /* PRESET TO VVR NOT FOUND | */ |
| 6577 | IF VWVFRD(ZR1)=ON&VWVFCRBA(ZR1)=ON THEN | /* IF VVR IS TO BE READ | |
| 6578 | | FROM A SPECIFIC RBA | */ |
| 6579 | DO; | | |
| 6588 | IF VWVRBA(ZR1)=>VDBHIRBA THEN | /* IF GREATER THAN HI RBA | |
| | | IN VVDS | */ |
| 6598 | CALL IGGVVER; | /* CLOSE AND OPEN VVDS | */ |
| 6606 | ZRFRD=ON; | /* INDICATE A READ REQUIRED | */ |
| 6616 | R1=1; | /* ONE BUFFER WANTED | */ |
| 6625 | CALL IGGPVGBU; | /* GET A BUFFER | */ |
| 6633 | ZR2=R1; | /* INDEX OF UNUSED BUFFER | */ |
| 6637 | VWVBUFN(ZR1)=ZR2; | /* BUFFER NUMBER FOR THIS VVR | */ |
| 6638 | VWBFUSE(ZR2)=ON; | /* MARK BUFFER IN USE | */ |
| 6639 | VWBFRD(ZR2)=ON; | /* SCHEDULE BUFFER FOR READ | */ |
| 6640 | VWBRBA(ZR2)=VWVRBA(ZR1); | /* SET RBA IN BUFFER ENTRY | */ |
| 6651 | VQNAME=VQNAMVDS; | /* MAJOR NAME | */ |
| 6652 | VRNAMRBA=VWBRBA(ZR2); | /* MINOR NAME | */ |
| 6653 | CCAEQDQ=ZZRES; | /* COPY IN PARM LIST | */ |
| 6656 | R1=ADDR(CCAEQDQ); | /* ENQ/DEQ PARM LIST AREA | */ |
| 6657 | GEN REFS (VQNAME,VRNAME,R1,WAREG,VWUCBAD); | | |

TABLE 22-continued
VVDS Manager Read VVR's
(Module IGGOCLE2)

| | | |
|---|---|---|
| 6658 | RESERVE (VQNAME(WAREG),VRNAME(WAREG),E,4,SYSTEMS), | |
| 6659 | UCB=VWUCBAD(WAREG),RELATED=(RBA),MF=(E,(1)) | |
| 6660 | @ENDGEN; | |
| 6663 | VWBFENGR(ZR2)=ON; | /* INDICATE ENQ DONE */ |
| 6668 | END; | |
| 6669 | END; | |
| 6677 | IF ZRFRD=ON THEN | /* IF ANY BUFFERS ARE TO BE READ */ |
| 6680 | CALL IGGPVMMB; | /* CALL MEDIA MANAGER TO |
| 6681 | | READ VVRS */ |
| 6696 | DO ZR1=1 TO DIM(VWVVRSEC); | /* FOR ALL VVRS */ |
| 6697 | IF VWVFRD(ZR1)=ON&VWVFCRBA(ZR1)=ON THEN | /* IF VVR IS TO BE READ |
| 6698 | | FROM A SPECIFIC RBA */ |
| 6699 | DO; | |
| 6702 | R1=ZP1; | |
| 6711 | CALL IGGPVCMP; | /* SEE IF VVR IN CI */ |
| 6721 | IF VWVRELP(ZR1)--=0 THEN | /* IF VVR FOUND */ |
| 6722 | DO; | |
| 6723 | VWVFRD(ZR1)=OFF; | /* RESET READ FLAG */ |
| 6724 | VWBFVALD(VWVBUFN(ZR1))=ON; | /* VALID CI IN BUFFER */ |
| 6725 | END; | |
| 6726 | ELSE | /* VVR NOT FOUND */ |
| 6727 | DO; | |
| 6728 | VWVFINCR(ZR1)=ON; | /* RBA PASSED IS INCORRECT */ |
| 6729 | IF VWVFNDSC(ZR1)=OFF THEN | /* IF SEARCH ALLOWED */ |
| 6730 | VWVRBA(ZR1)=VVVRFST; | /* RBA TO START SEARCH */ |
| 6731 | ELSE | /* NO SEARCH ALLOWED */ |
| 6732 | DO; | |
| 6733 | VWVFZIP(ZR1)=ON; | /* VVR NOT FOUND */ |
| 6734 | VWVFRD(ZR1)=OFF; | /* DONT TRY TO SEARCH */ |
| 6735 | END; | |
| 6736 | END; | |
| 6737 | END; | |
| 6738 | END; | |
| 6783 | ZRRBA=MAXVAL; | /* HI STARTING RBA FOR SEARCH */ |
| 6784 | ZRCOUNT=0; | /* COUNT OF VVRS */ |
| 6792 | DO ZR1=1 TO DIM(VWVVRSEC); | /* FOR ALL VVR ENTRIES */ |
| 6793 | IF VWVFRD(ZR1)=ON THEN | /* IF VVR IS TO BE READ */ |
| 6794 | DO; | |
| 6795 | ZRRBA=MIN(ZRRBA,VWVRBA(ZR1)); | /* FIND LOWEST START RBA */ |
| 6796 | ZRCOUNT=ZRCOUNT+1; | /* COUNT THE REMAINING VVRS */ |
| 6797 | END; | |
| 6798 | END; | |
| 6807 | DO WHILE ZRCOUNT>0&ZRRBA<VDBHIRBA; | /* DO WHILE THERE ARE VVRS |
| 6808 | | TO FIND AND END OF VVDS |
| 6809 | | NOT REACHED */ |
| 6838 | DO ZR2=1 TO DIM(VWBUFSEC); | /* SEARCH ALL BUFFERS */ |
| 6839 | IF VWBFUSE(ZR2)=ON&VWBRBA(ZR2)=ZRRBA THEN | /* IF CI IS IN THIS |
| 6840 | | BUFFER */ |
| 6841 | LEAVE; | /* FOUND IT */ |
| 6842 | END; | |
| 6843 | IF ZR2>DIM(VWBURFSEC) THEN | /* IF CI NOT ALREADY IN A |
| 6844 | | BUFFER */ |
| 6845 | DO; | |
| 6846 | DO ZR2=1 TO DIM(VWBUFSEC); | /* FOR ALL BUFFERS */ |
| 6847 | IF VWBFBUFF(ZR2)=ON&VWBFUSE(ZR2)=OFF THEN | /* IF BUFFER |
| 6848 | | EXISTS AND IS UNUSED */ |
| 6849 | LEAVE; | /* LEAVE DO LOOP */ |
| 6850 | END; | |
| 6851 | IF ZR2>DIM(VWBUFSEC) THEN | /* IF NO FREE BUFFERS */ |
| 6852 | DO; | |
| 6853 | RFY | |
| 6854 | R1 RSTD; | |
| 6855 | R1=1; | /* ONE BUFFER WANTED */ |
| 6863 | CALL IGGPVGBU; | /* GET A BUFFER */ |
| 6871 | ZR2=R1; | /* INDEX OF UNUSED BUFFER */ |
| 6874 | END; | |
| 6875 | VWVBUFN(ZR1)=ZR2; | /* BUFFER NUMBER FOR THIS VVR */ |
| 6876 | VWBPBA(ZR2)=ZRRBA; | /* RBA */ |
| 6877 | VWBFUSE(ZR2)=ON; | /* MARK BUFFER IN USE */ |
| 6878 | VWBFRD(ZR2)=ON; | /* SCHEDULE BUFFER FOR READ */ |
| 6879 | IF VWGERBA=ON THEN | /* IF RBA ENQ REQUIRED */ |
| 6880 | DO; | |
| 6888 | VQNAME=VQNAMVDS; | /* MAJOR NAME */ |
| 6889 | VRNAMRBA=VVWBRBA(ZR2); | /* MINOR NAME */ |
| 6890 | CCAEQDQ=ZZRES; | /* COPY IN PARM LIST */ |
| 6891 | VWBFENQR(ZR2)=ON; | /* INDICATE ENQ DONE */ |
| 6894 | R1=ADDR(CCAEQDQ); | /* ENQ-DEQ PARM LIST AREA */ |
| 6895 | GEN REFS(VQNAME,VRNAME,R1,WAREG,VWUCBAD); | |
| 6896 | RESERVE (VQNAME(WAREG),VRNAME(WARED),E,4,SYSTEMS), | |
| 6897 | UCB=VWUCBAD(WAREG),RELATED=(RBA),MF=(E,(1)) | |

TABLE 22-continued

VVDS Manager Read VVR's
(Module IGGOCLE2)

| | | | |
|---|---|---|---|
| 6898 | @ENDGEN; | | |
| 6901 | END; | | |
| 6903 | CALL IGGPVMMB; | /* CALL MEDIA MANAGER INTERFACE | */ |
| 6911 | END; | | |
| 6919 | DO ZR1=1 TO DIM(VWVVRSEC); | /* FOR ALL VVR ENTRIES | */ |
| 6920 | IF VWVFRD(ZR1)=ON&VWVRBA(ZR1)<=ZRRBA THEN | /* IF VVR IS TO BE | |
| 6921 | | SEARCHED AND WE ARE AT | |
| 6922 | | START RBA | */ |
| 6923 | DO; | | |
| 6924 | VWVBURN(ZR1)=ZR2; | /* BUFFER NUMBER | */ |
| 6927 | R1=ZR1; | | |
| 6936 | CALL IGGPVCMP; | /* SEE IF VVR IN CI | */ |
| 6946 | IF VWVRELP(ZR1)≠0 THEN | /* IF VVR FOUND | */ |
| 6947 | DO; | | |
| 6948 | VWVFRD(ZR1)=OFF; | /* RESET READ FLAG | */ |
| 6949 | VWVRBA(ZR1)=VWBRBA(ZR2); | /* PUT RBA INTO VVR ENTRY | */ |
| 6950 | VWBFVALD(ZR2)=ON; | /* VALID CI IN BUFFER | */ |
| 6951 | ZRCOUNT=ZRCOUNT−1; | /* VVRS LEFT TO READ | */ |
| 6952 | END; | | |
| 6953 | END; | | |
| 6954 | END; | | |
| 6962 | IF VWBFVALD(ZR2)=OFF THEN | /* IF NO VVR IN THIS CI | */ |
| 6963 | DO; | | |
| 6964 | VWBFUSE(ZR2)=OFF; | /* BUFFER NOT IN USE | */ |
| 6965 | IF VWBFENQR(ZR2)=ON THEN | /* IF RBA ENQED FOR THIS BUFFER | */ |
| 6966 | DO; | | |
| 6974 | VQNAME=VQNAMVDS; | /* MAJOR NAME | */ |
| 6975 | VRNAMRBA=VWBRBA(ZR2); | /* MINOR NAME | */ |
| 6976 | CCAEQDQ=ZZDEQ; | /* COPY IN PARM LIST | */ |
| 6977 | VWBFENQR(ZR2)=OFF; | /* INDICATE DEQ DONE | */ |
| 6980 | R1=ADDR(CCAEQDQ); | /* ENQ/DEQ PARM LIST AREA | */ |
| 6981 | GEN REFS(VQNAME,VRNAME,R1,WAREG,VWUCBAD); | | |
| 6982 | DEQ (VQNAME(WAREG),VRNAME(WAREG),4,SYSTEMS), | | |
| 6983 | UCB=VWUCBAD(WAREG),RELATED=(RBA),MF=(E,(1)) | | |
| 6984 | @ENDGEN; | | |
| 6987 | END; | | |
| 6988 | END; | | |
| 6989 | ZRRBA=ZRRBA+VCISIZE; | /* NEXT RBA TO CHECK | |
| 6990 | END; | | |
| 6998 | IF ZRCOUNT≠0 THEN | /* IF SOME VVRS WEREN'T FOUND | */ |
| 6999 | DO ZR1=1 TO DIM(VWVVRSEC); | /* DO FOR ALL VVR ENTRIES | */ |
| 7000 | IF VWVFRD(ZR1)=ON THEN | /* IF VVR NOT READ | */ |
| 7001 | DO; | | |
| 7002 | VWVFRD(ZR1)=OFF; | /* RESET READ FLAG | */ |
| 7003 | VWVFZIP(ZR1)=ON; | /* VVR NOT FOUND | */ |
| 7004 | END; | | |
| 7005 | END; | | |
| 7015 | CALL EXIT; | /* RETURN TO CALLER | */ |
| 7018 | END; | | |

TABLE 23

VVDS Manager Search A CI For A VVR
(Module IGGOCLE4)

| | | | |
|---|---|---|---|
| 7777 | IGGPVCMP: | | |
| 7778 | PROC OPTIONS(NOSAVEAREA,NOSAVE); | /* SPECIFY PROCEDURE OPTIONS | */ |
| 7836 | ZC1=R1; | /* INDEX OF WORK AREA VVR ENTRY | */ |
| 7839 | ZCPARMP=VWENTRYP(ZC1); | /* POINTER TO PARM ENTRY | */ |
| 7840 | RFY | | |
| 7841 | VDSENTRY BASED(ACPARMP)); | | |
| 7842 | ZCBUFFP=ADDR(VWBBUFFP(VWVBUFN(ZC1))−>VBUFFER); | /* | |
| 7843 | ADDRESS OF CI | | */ |
| 7844 | ZCCIDFP=ZCBUFFP+LENGTH(VBUFFER)−LENGTH(IDACIDF); | /* | |
| 7845 | POINTER TO CIDF | | */ |
| 7846 | RFY | | |
| 7847 | IDACIDF BASED(ZCCIDFP); | | |
| 7848 | ZCRDFLP=ZCBUFFP+CIDFOSET+CIDFLL; | /* ADDRESS OF LAST RDF | */ |
| 7849 | ZCRDFP=ZCCIDFP−LENGTH(IDARDF); | /* ADDRESS OF FIRST RDF | */ |
| 7850 | RFY | | |
| 7851 | IDARDF BASED(ZCRDFP); | | |
| 7852 | ZCVVRP=ZCBUFFP; | /* ADDRESS OF FIRST VVR | */ |
| 7853 | DO ZC2=1 TO VWVRELP(ZC1)−1; | /* FIND ADDRS OF VVR AND RDF | |
| 7854 | | TO START SEARCH | */ |
| 7855 | ZCVVRP=ZCVVRP+RDFLL; | /* NEXT VVR | */ |
| 7856 | ZCRDFP=ZCRDFP−LENGTH(IDARDF); | /* NEXT RDF | */ |
| 7857 | END; | | |

TABLE 23-continued
VVDS Manager Search A CI For A VVR
(Module IGGOCLE4)

| | | | |
|---|---|---|---|
| 7858 | IF VWVRBA(ZC1)=0 THEN | /* IF VVCR REQUEST | */ |
| 7859 | DO; | | |
| 7860 | VWVRELP(ZC1)=1; | /* RELATIVE POSITION | */ |
| 7861 | VWVVVRP(ZC1)=ZCBUFFP; | /* ADDRESS OF VVCR | */ |
| 7862 | END; | | |
| 7863 | ELSE | /* NOT A VVCR | */ |
| 7864 | DO; | | |
| 7865 | RFY | | |
| 7866 | VVR BASED(ZCVVRP); | | |
| 7867 | VWVRELP(ZC1)=0; | /* INITIALIZE TO NOT FOUND | */ |
| 7868 | DC1: | | |
| 7869 | DO ZC2=ZC2 BY 1 WHILE ZCRDFP>=ZCRDFLP; | /* FOR ALL VVRS | */ |
| 7870 | IF(VWVSCOMP(ZC1)=OFF\|(VWVSCOMP(ZC1)=ON&VWCMPLN(ZC1)= | | |
| 7871 | VVRCMPNL-1&VDSCMPNM(1:VVRCMPNL-1)=VVRCMPNM(1:VVRCMPNL-1) | | |
| 7872 | THEN | /* IF COMPONENT NAME OK | */ |
| 7873 | DO; | | |
| 7874 | ZCP=ADDR(VVRV2); | /* ADDRESS OF CLUSTER INFO | */ |
| 7875 | IF(VWVSCLUS(ZC1)=OFF\|(VWCMPLN(ZC1)=ZCP->VVRKEYL-1& | | |
| 7876 | VDSCMPNM(1:VWCMPLN(ZC1))=ZCP->VVRKEY | | |
| 7877 | (1:VWCMPLN(ZC1)))) THEN | /* IF CLUSTER NAME OK | */ |
| 7878 | DO; | | |
| 7879 | ZCP=ZCP+ZCP->VVRKEYL)+LENGTH(VVRKEYL); | /* | |
| 7880 | | CATALOG INFO | */ |
| 7881 | IF(VWVSCTLG(ZC1)=OFF\|(VWCATLN(ZC1)=ZCP-> | | |
| 7882 | VVRCATNL&VDSCATNM(1:ZCP->VVRCATNL)= | | |
| 7883 | ZCP->VVRCATNM(1:ZCP->VVRCATNL))) | | |
| 7884 | THEN | /* IF CATLG NAME OK | */ |
| 7885 | DO; | | |
| 7886 | ZCP=ZCP+VVRCATNL+LENGTH(VVRCATNL); | /* ADDR | |
| 7887 | | OF AIX INFO | */ |
| 7888 | IF(VWVSAIX(ZC1)=OFF\|(VWCMPLN(ZC1)= | | |
| 7889 | ZCP->VVRAIXNL-1&VDSCMPNM(1:VWCMPLN(ZC1)) | | |
| 7890 | =ZCP->VVRAIXNM(1:VWCMPLN(ZC1)))) | | |
| 7891 | THEN | /* IF AIX NAME OK | */ |
| 7892 | DO; | | |
| 7893 | IF VVRTYPE=VVRPRMHD THEN | /* IF PRIMARY | |
| 7894 | | RECORD | */ |
| 7895 | ZCVOLP=ADDR(VVRVOLIN); | /* VOL ENTRY IN | |
| 7896 | | NORMAL PLACE | */ |
| 7897 | ELSE | /* SECONDARY RECORD | */ |
| 7898 | ZCVOLP=ADDR(VVRDSINF); | /* VOL ENTRY | |
| 7899 | | FOLLOWS HEADER | */ |
| 7900 | RFY | | |
| 7901 | VVRVOLIN BASED(ZCVOLP); | | |
| 7902 | IF(VWVSLOKR(ZC1)=OFF\|(VDSLKRGL= | | |
| 7903 | VVRLOKYL&VDSLKYRG(1:VVRLOKYL)= | | |
| 7904 | VVRLOKYV(1:VVRLOKYL))) | | |
| 7905 | THEN | /* IF LOW KEY RANGE OK | */ |
| 7906 | IF(VWVSDATA(ZC1)=OFF\|(VVRCOMTP=OFF)) | | |
| 7907 | THEN | /* IF DATA COMP CHECK OK | */ |
| 7908 | IF(VWVSINDX(ZC1)=OFF&VVRSSDAT=OFF)\|( | | |
| 7909 | VWVSINDX(ZC1)=ON&VVRCOMTP=ON&(( | | |
| 7910 | VWVSSEQS(ZC1)=OFF&VVRSSDAT=OFF)\|( | | |
| 7911 | VWVSSEQS(ZC1)=ON&VVRSSDAT=ON))) | | |
| 7912 | THEN | /* IF INDEX COMP CHECK OK | */ |
| 7913 | DO; | | |
| 7914 | VWVRELP(ZC1)=ZC2; | /* RELATIVE | |
| 7915 | | POSITION | */ |
| 7916 | VWVVVRP(ZC1)=ZCVVRP; | /* ADDRESS | |
| 7917 | | OF VVR | */ |
| 7918 | LEAVE DC1; | /* FOUND IT -- | |
| 7918 | | LEAVE DO LOOP | */ |
| 7920 | END; | | |
| 7921 | END; | | |
| 7922 | END; | | |
| 7923 | END; | | |
| 7924 | END; | | |
| 7928 | ZCVVRP=ZCVVRP+RDFLL; | /* NEXT VVR | */ |
| 7929 | ZCRDFP=ZCRDFP-LENGTH(IDARDF); | /* NEXT RDF | */ |
| 7930 | END; | | |
| 7931 | END; | | |
| 7942 | CALL EXIT: | /* RETURN TO CALLER | */ |
| 7945 | END; | | |

In each of Tables 21-23, an arbitrary line number (which is not necessarily unique between tables) is followed by the PL/1-like statement, followed by explanatory remarks having /* at the beginning and */ at the conclusion of the remarks.

In Table 21, the entry point to the routine is at line 6305. Procedure IGGPVRED is called by the VVDS manager 34 at step 246 (FIG. 11) when the user has passed a request to VVDS manager 34 to read one or more VVR's, the RBA's of which may or may not have been specified by the user. The inputs to IGGPVRED are

| | |
|---|---|
| R11 = | CCA address |
| R12 = | Base address |
| R14 = | Return address |

The output will be the CCA address in register R11.

In steps 6306-6406, the procedure calls a routine IGGPVALO to enqueue (i.e. serialize) the VVDS for shared access (as this is a read, not write, procedure), and then builds in a buffer a work area for each VVR requested by the user, indicating from user-supplied data whether each VVR is sequence set VVR (steps 6387-6390), indicating (steps 6392-6397) the relative byte address (RBA) of the control interval (CI) where the user (or caller) thinks the VVR is located, and indicating (steps 6382-6385) the key of the VVR's wanted.

Having initialized the buffer work areas, at step 6414, procedure IGGPVRED calls procedure IGGPVRDX to read the VVR's (see Table 22), which returns control to IGGPVRED at line 6415.

Beginning at line 6417, IGGPVRED loops through all of the buffer work areas to find out what happened during the IGGPVRDX procedure (Table 22, to be described hereafter), asking if the RBA specified by the user was correct and, if not, setting indicator VDSERRBA on in the caller's parameter list (caller and user are used synonymously) and, at line 6421, giving the caller the correct RBA for the VVR. With this information, BCS manager 32 can correct the pointers in the sphere record (see steps 232-234, FIG. 9).

At step 6428 (Table 21), the test is made whether the VVR was found by IGGPVRDX, either at the user-specified CI or elsewhere, as will be further described hereinafter, and if so, in steps 6442-6465, the VVR is moved in step 6459 from the work area of the buffer into the caller's area at VDSBUFAD (see also Table 16, VVDS Manager Protocol Parameter List—VVDSP-ARM). If the VVR was not found, an error condition exists, and in step 6481 an exit to the caller occurs.

Steps 6483-6484 condition the procedure for processing another buffer work area (returning to step 6417) or, if all work areas have been processed, a normal exit occurs at step 6494, ending procedure IGGPVRED and the reading of the VVRS.

In Table 22 is set forth the procedure IGGPVRDX, called from step 6414 of Table 21 for the purpose of searching the VVR entries in a work area, reading any marked for read and checking any search criteria. The entry point is labeled IGGPVRDX at step 6478, which ends at step 7018 (Table 22). The inputs are

| | |
|---|---|
| R11 = | Catalog Communicator Area (CCA) Address |
| R12 = | Base Register |
| R14 = | Return Address |

The output will be

R11 = CCA Address

Steps 6574-6598 initialize flags and indicators and test the user-supplied RBA against the VVDS. If the RBA is greater than the highest RBA in the VVDS, then in step 6598 a call is made to procedure IGGPVVER, which will close and then reopen the VVDS, thus updating the control block structure for the VVDS data set in the calling CPU, a precaution only necessary in a multi-CPU environment.

In steps 6625-6640, a buffer in main storage is established as a VVDS manager work area, and in steps 6651-6663 the procedure enqueues on the RBA of the record to be read, and in a multi-CPU environment, reserves the volume for this CPU's exclusive use. At step 6680, a call to the media manager interface procedure IGGPVMMB is made, which procedure will read the record (control interval) from disk storage into the main storage buffer.

In steps 6696-6738, for all VVR's to be located in a particular control interval, a call is made to procedure IGGPVCMP (which searches a control interval after it has been loaded into main storage—see Table 23). The procedure of steps 6783-6951 looks for all VVR's, first checking if the control interval to be reached is in a buffer (step 6838), and, if not, getting a buffer, if needed (step 6846) and reading the CI into the buffer (step 6903). At step 6919 the procedure is looking for VVR's not previously found where the caller said they should be. At step 6951, having found a VVR, the count of requested VVR's not found is decremented.

In the procedure of Table 22 is illustrated the method steps of the invention of directly accessing a VVR with a pointer from the sphere record, and if not found, key searching the VVDS for it. The details of the key search of a control interval (either specified by pointer from sphere record and provided to the VVDS manager by the caller, or obtained by a sequential search of VVDS if not found in the user-specified control interval) are set forth in Table 23—the procedure called from step 6711 (Table 22).

In Table 23 is set forth procedure IGGPVCMP, which performs a search in main storage of a control interval (CI) for a VVR identified by a key. Normally, from 5 to 10 VVR's exist in a control interval, and these are located for parsing by offsets recorded in the record definition fields (RDF). The format of a control interval is set forth in Table 24.

TABLE 24

Control Interval Format

| RECORD 1 | RECORD 2 | . . . . . . | RDF2 | RDF1 | CIDF |
|---|---|---|---|---|---|

The CIDF is the control interval definition field, and the RDF's describe the offset to the records they define. Herein, records are the VVR's, previously described.

The inputs to IGGPVCMP (Table 23) are:

| | |
|---|---|
| R1 = | Index to work area VVR entry. |
| VWVRELP = | Relative VVR in CI to start search. |
| R11 = | CCA Address. |
| R12 = | Base Register |
| R14 = | Return Address. |

The outputs from IGGPVCMP (Table 23) are:

| | |
|---|---|
| R11 = | CCA Address |
| VWVRELP = | Position of VVR in CI or zero |

-continued if VVR not found.

In steps 7836-7868 the procedure is initialized for parsing the VVR records in the control interval. In steps 7869-7913 the VVR's are key searched. The user can specify that one or more fields (data component name, cluster name, catalog name, auxiliary index name AIX, index component name) comprise the key to be found. When all specified key checks are satisfied, in step 7917 the address of the VVR located is loaded and processing continues to the next VVR to be located at step 7928.

BEST MODE FOR CARRYING OUT THE INVENTION

Referring to the figures, the best mode for carrying out the invention will be described. Loosely coupled CPU's 29 and 26 share access to volumes 20-25—for example, catalog volume 21, including sphere records 82 and 83, and data volume 23, including volume data set 131 and a plurality of user data sets 141-144.

In order to open a user's data set 142, identified by key K3 and including data E3 in CPU 29, VSAM OCE 44 opens (i.e. builds control blocks into main storage 27) BCS 91 allowing access to sphere records contained therein. BCS manager 32 invokes VSAM record management 52 to perform a keyed retrieval of sphere record 83 containing key K3.

Upon locating sphere record 83, control is passed to VVDS manager 34, along with the direct address pointer in sphere record 83 to the location of volume record 114, and the key identifier K3. VVDS manager 34 retrieves volume record 114, and reads it into main storage 27, where its key K9' is compared with the data set key K3. In this example, because of a prior failure to update the pointers in sphere record 83, the sphere record 83 key K3 and the volume record 114 key K9' do not correspond. Consequently, VVDS manager 34 sequentially retrieves and examines the other volume records until the key comparison indicates correspondence (for volume record 113, in this example). Control is returned to BCS manager 32, which will correct the address pointer in sphere record 83 to point to volume record 113, and thus avoid, on subsequent openings of data set 142, the sequential scan of volume data set 131. Also, volume record 113, already being in main storage 27, is used to build in main storage 27 the control blocks opening data set 142, which can then be read into main storage 27 for use by the requestor.

INDUSTRIAL APPLICABILITY

The invention provides apparatus and means for cataloging data sets on data volumes in a computing system such as one having a plurality of central processors sharing access to the data volumes and to data sets recorded on the data volumes. The efficiency of direct access to the data sets is achieved through the use of a keyed base catalog structure which includes direct pointers to volume records in a keyed volume data set, which volume records contain the user data set descriptions and extent information. System failures may result in the pointers in the base catalog to the volume records becoming obsolete. This is detected by a key comparison, and compensated for by a key search of the volume record.

While the preferred embodiments of the invention have been illustrated and described, it is to be understood that such does not limit the invention to the precise constructions herein disclosed, and the right is reserved to all changes and modifications coming within the scope of the invention as defined in the appended claims.

I claim:

1. A method for operating a computing system under control of a catalog management facility referencing a catalog data set residing on a first data volume to open a user data set residing on a second data volume, where said first or second data volume may have been changed by events external to the catalog management facility, resulting in loss of synchronization between said user data set and said catalog data set, comprising the steps of;

searching said catalog data set for a first record keyed to said user data set, said first record including a pointer to a second record in a volume data set residing on said second data volume;

responsive to said pointer, retrieving said second record;

testing the key of said second record to detect a loss of synchronization; and, if said second record is keyed to said user data set and thus indicates synchronization, opening the user data set described by said second record; otherwise, searching said volume data set in said second data volume to retrieve a third record keyed to said user data set, and upon locating said third record, updating said pointer to reestablish synchronization between said pointer and said user data set, and opening the user data set described by said third record;

whereby said user data set is opened without signaling an error to the user even though loss of synchronization has previously resulted from an external event such as a restoration of said first data volume or said second data volume from an archival data volume.

2. The method of claim 1 for operating said computing system further to define said user data set on said data volume, comprising the steps of:

serializing said catalog data set and said volume data set for write access;

allocating space on said data volume for said user data set;

generating said second record to include said key and extent information describing said allocated space;

writing said second record into said volume data set;

generating said first record to include said key and a pointer to said second record; and writing said first record into said catalog data set.

3. The method of claim 1 for operating said computing system further to recatalog a second user data set, comprising the steps of:

serializing said catalog data set for write access;

searching said volume data set to retrieve a fourth record keyed to said second user data set;

generating a fifth record to include the key of said second user data set and a pointer to said fourth record;

writing said fifth record into said catalog data set.

4. The method of claim 2 for operating said computing system in a multiprocessing environment wherein said data volume is shared by at least two loosely coupled central processors, and wherein said serializing step, when performed by one central processor, comprises the further step of locking said catalog data set and said volume data set against access by all other central processsors sharing said data volume.

5. The method of claim 4, comprising the further steps of:

maintaining in said volume data set a catalog self-describing volume record including a data set characteristics field and a first time field updated during each write access to said catalog data set to record the time of write access;

maintaining for said catalog data set in said one central processor a plurality of control block fields including a second time field updated during each write access to said catalog data set by said one central processor to record the time of write access; and the serializing step comprising the further steps performed by said one central processor of:

comparing said first and second time fields and, if not equal, updating said plurality of control block fields from data set characteristics in said self-describing volume record, and setting said second time field equal to said first time field;

whereby said catalog data set characteristics are maintained current in all central processors sharing access to said catalog data set.

6. A method for operating a computing system under control of a catalog management facility referencing a catalog data set, the computing system including at least one central processing unit coupled to at least one data volume, to open a user data set in said data volume, the user data set being identified by a data set key, and wherein said data volume may have been changed by events unknown to said catalog management facility, resulting in loss of synchronization between said user data set and said catalog data set, the method comprising the steps of:

(1) retrieving from said catalog data set a sphere record associated by key with said user data set;

(2) fetching from said sphere record a first address to a first volume record in a keyed volume data set residing on said data volume;

(3) responsive to said first address, retrieving from said volume data set said first volume record;

(4) comparing the key of said first volume record with said data set key to detect a loss of synchronization;

(5) if said keys do not compare equal, key searching said volume data set for the volume record containing the correct key, and updating said sphere record to contain the address of the correct volume record; and (6) building user data set control blocks from data set characteristics contained in the volume record key associated with said user data set;

whereby said user data set is opened without signaling an error to a user even though the catalog data set and the user data set may have lost synchronization as a result of an external event such as restoration of said data volume from an archival data volume.

7. The method of claim 6 for operating said computing system further to define said user data set on said and volume, comprising the steps of:

serializing said catalog data set and said volume data set for write access;

allocating space on said data volume for said user data set;

generating a volume record to include said key and extent information describing the allocated space;

writing the generated volume record into said volume data set;

generating a sphere record to include said key and a pointer to said generated volume record; and writing the generated sphere record into said catalog data set.

8. The method of claim 7 for operating said computing system to extend said user data set, comprising the steps of:

serializing said volume data set for write access;

allocating additional space on said data volume for said user data set;

retrieving from said catalog data set the generated sphere record;

responsive to the pointer and, selectively, the key fields of said generated sphere record, retrieving said generated volume record from said volume data set;

updating said generated volume record to describe the new allocation of space on said data volume;

writing the updated volume record into said volume data set; and, if the updated volume record was written into a different location than said generated volume record, updating the generated sphere record to point to said updated volume record.

9. The method of claim 7 for operating said computing system further to recatalog said user data set, comprising the steps of:

serializing said catalog data set for write access;

searching said volume data set to retrieve the volume record containing the key of said user data set;

generating a recatalog sphere record to include said key and a pointer to the retrieved volume record, and writing the recatalog sphere record into said catalog data set.

10. The method of claim 7 for operating said computing system to create, prior to defining said user data set, a volume data set for storing the volume records, comprising the steps of:

allocating space on said data volume for said volume data set;

generating a volume control record, including fields identifying the catalog data set(s) using said volume data set and a control interval space map for recording for each control interval in the volume data set indicia representative of control interval space utilization; and writing said volume data set into said data volume.

11. The method of claim 10 for operating said computing system to write a volume record into said volume data set, comprising the steps of:

searching said volume control record for the name of the requesting catalog data set associated with a request to write a new volume record and, if not present, inserting the name;

searching said volume control record space map for a first control interval with adequate free space for said new volume record;

accessing said first control interval to insert said new volume record;

updating said free space map to reflect the new space utilization of said first control interval; and generating a new sphere record containing the address of said first control interval as a pointer to said new volume record; and writing said new sphere record into said requesting catalog data set.

12. The method of claim 7 for operating said computing system to define a catalog data set preliminary to defining said user data set, comprising the steps of:
   allocating space on a volume for said catalog data set;
   generating catalog self-describing volume records including catalog identification and extent information;
   writing said catalog self-describing volume records into the volume data set;
   inserting the name of said catalog data set and the addresses of said catalog self-describing volume records into a volume control record within said volume data set;
   generating a catalog self-describing sphere record containing the name of said catalog data set and address pointers to said self-describing volume records; and
   writing said catalog self-describing sphere record into the space allocated on the volume for the catalog data set.

13. The method of claim 12 further for opening said catalog data set when the catalog self-describing sphere record is not available such as when the catalog data set is not in an open state, comprising the steps of:
   searching said volume control record for the name of said catalog data set and fetching the associated address pointers;
   responsive to said associated address pointers, retrieving from said volume data set, the catalog self-describing volume records;
   verifying that said associated address pointers are correct and, if not, updating said volume control record with the correct address pointers; and
   opening the catalog data set from data set characteristics and extent information contained in said catalog self-describing volume records.

14. The method of claim 12 for operating said computing system, the computing system including at least two central processing units sharing said data volume for one central processing unit to serialize a read operation, the method comprising the steps of:
   maintaining in said catalog self-describing volume record a first time field updated during each write access to said catalog data set to record the time of write access;
   maintaining in each central processing unit a write access time field updated during each write access by said each central processing unit to said catalog data set to record the time of write access; and
   after serializing a read or write operation by said one central processing unit, comparing said first time field with the write access time field of said one central processing unit, and if they do not correspond, updating catalog control blocks describing said catalog data set and updating the write access time field.

15. The method of claim 14 for operating said computing system in a multiprocessing environment to serialize a write operation by one central processor comprising the further step of locking said catalog data set and said volume data set against access by the other central processors.

16. A method for operating a computing system to catalog user data sets on a plurality of data volumes, the computing system including at least two loosely coupled processors sharing access to at least one of said data volumes, the method establishing a catalog structure, including a base catalog structure, residing on the shared data volume, which enables the opening of a user data set on a second data volume even where an external event has changed a data volume, resulting in loss of synchronization between said base catalog and said user data set, the method comprising the steps of:
   defining a base catalog structure by:
      allocating space on said shared data volume for the base catalog structure;
      generating a data volume record and an index volume record for describing the base catalog structure data and index components;
      writing said data volume record and said index volume record into addressable locations in a volume data set on said shared data volume;
      inserting the catalog name and pointers to said data volume record and index volume record into a volume control record in said volume data set;
      generating a catalog sphere record including direct address pointers to said data volume record and said index volume record; and
      writing said catalog sphere record into said base catalog structure on said shared data volume; and
   defining a plurality of user data sets into a catalog, each data set having a key name, and the catalog including said base catalog structure and said volume data set, by executing the following steps for each user data set to be defined:
      allocating space on said second data volume for a user data set:
      generating one or more user volume records for describing said user data set;
      writing said user volume records into an addressable location in said volume data set;
      generating a user sphere record, including direct address pointers to said user volume records and the key names of the user data set components;
      writing said user sphere record into said base catalog structure.

17. The method of claim 16 further for operating said computing system to open a specified user data set identified by a given key comprising the steps of:
   searching said base catalog for a specified sphere record containing said given key;
   retrieving from said specified sphere record a first address pointer to a first volume record;
   responsive to said first address pointer, retrieving said first volume record;
   comparing said given key with the key name of said first volume record; if said given key and said key name of said first volume record do not correspond and thus indicate a loss of synchronization, searching said volume data set to retrieve a second volume record having a key name corresponding to said given key, and updating said first address pointer to address said second volume record; and
   building the control blocks to open said specified user data set from data set characteristics contained in the volume record identified by said given key.

18. Apparatus for cataloging user data sets stored on a data volume to enable opening of a user data set by a central processor having access to the data volume and a main storage, said apparatus enabling opening of a user data set even though residing on a volume which, due to some external event, has been changed to cause loss of synchronization, the apparatus comprising:

means providing a volume data set for storing a plurality of volume records each containing identification information including at least one key field and extent information for user data sets recorded on the data volume;

base catalog means for storing a plurality of sphere records, each sphere record containing one or more key fields identifying a user data set and a direct address pointer to a corresponding volume record;

means for opening a first user data set having a key name by building, in the main storage, control blocks providing user data set identification and extent information, said means for opening including:

first means for searching said base catalog means for a first sphere record containing said key name in its key field;

second means responsive to the direct address pointer stored in said first sphere record for retrieving a first volume record;

third means for comparing said key name with a first key field of said first volume record;

fourth means, responsive to a failure of correspondence between said key name and said first key field and thus indicative of a loss of synchronization, for searching said volume data set means for a second volume record containing a second key field corresponding to said key name, and for writing into said first sphere record a direct address pointer to said second volume record; and means for retrieving information defining the extent of said first user data set from that one of said volume records which contains a key field corresponding to said key name.

19. The apparatus of claim 18 further comprising:

self-describing sphere record means stored in said base catalog means for storing direct address pointers to self-describing volume records containing extent information for said base catalog means;

volume control record means stored in the volume data set for storing direct address pointers to said self-describing volume records containing extent information for said base catalog means;

means for opening said base catalog means, including means responsive selectively to said self-describing sphere record means or said volume control record means for accessing said self-describing volume records to obtain the base catalog extent information.

20. The apparatus of claim 18 further comprising:

means responsive to a request for defining a first user data set on a data volume for allocating space on said data volume for said volume data set; and means for generating and writing into said volume data set a volume control record including fields for identifying related base catalog means and fields for recording indicia representative of the space utilization of control intervals within said volume data set.

21. The apparatus of claim 20, further responsive to a request to define a user data set for generating associated sphere record and volume records, the means for generating including:

means for searching said volume control record for an addressable control interval with sufficient space for said associated volume record;

means for writing said associated volume record into said addressable control interval;

means for recording in said associated sphere record the address of said addressable control interval.

* * * * *